(12) United States Patent
Hayashi et al.

(10) Patent No.: US 8,405,773 B2
(45) Date of Patent: Mar. 26, 2013

(54) VIDEO COMMUNICATION QUALITY ESTIMATION APPARATUS, METHOD, AND PROGRAM

(75) Inventors: Takanori Hayashi, Tokyo (JP); Kazuhisa Yamagishi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1449 days.

(21) Appl. No.: 11/990,256

(22) PCT Filed: Sep. 6, 2006

(86) PCT No.: PCT/JP2006/317637
§ 371 (c)(1),
(2), (4) Date: Feb. 7, 2008

(87) PCT Pub. No.: WO2007/029731
PCT Pub. Date: Mar. 15, 2007

(65) Prior Publication Data
US 2009/0096874 A1    Apr. 16, 2009

(30) Foreign Application Priority Data

Sep. 6, 2005 (JP) ................................. 2005-257880
Jun. 21, 2006 (JP) ................................. 2006-171240

(51) Int. Cl.
*H04N 7/14*     (2006.01)
*H04N 9/475*    (2006.01)
(52) U.S. Cl. ...................... 348/515; 348/14.12; 348/512
(58) Field of Classification Search .................. 348/515
See application file for complete search history.

(56) References Cited

U.S. PATENT DOCUMENTS 5,596,364 A * 1/1997 Wolf et al. ................... 348/192
6,453,336 B1 * 9/2002 Beyda et al. ................. 709/204

FOREIGN PATENT DOCUMENTS

| JP | 08-289333 A | 11/1996 |
| JP | 2001-298428 A | 10/2001 |
| JP | 2002-519960 A | 7/2002 |
| JP | 2004-523978 A | 8/2004 |
| JP | 2005-244321 A | 9/2005 |
| JP | 2006-128972 A | 5/2006 |
| WO | WO 99/21173 | 4/1999 |

OTHER PUBLICATIONS

Beerends et al., The Influence of Video Quality on Perceived Audio Quality and Vice Versa, Journal of the Audio Engineering Society, May 1, 1999, pp. 355-362, vol. 47, No. 5, Audio Engineering Society, New York, NY.

(Continued)

*Primary Examiner* — Vivek Srivastava
*Assistant Examiner* — Ricky Chin
(74) *Attorney, Agent, or Firm* — Blakely, Sokoloff, Taylor & Zafman

(57) ABSTRACT

A multi-modal quality estimation unit (11) estimates a multi-modal quality value (23A) on the basis of an audio quality evaluation value (21A) and a video quality evaluation value (21). In addition, a delay quality degradation amount estimation unit (12) estimates a delay quality degradation amount (23B) on the basis of an audio delay time (22A) and a video delay time (22B). A video communication quality estimation unit (13) estimates a video communication quality value (24) on the basis of a multi-modal quality value (23A) and a delay quality degradation amount (23B).

7 Claims, 18 Drawing Sheets

OTHER PUBLICATIONS

Hayashi et al., A Study on Multi-modal Quality Estimation Model Considering Conversational Factors, Eizo Joho Media Gakkai Gijutsu Hokoku—ITE Technical Report, Sep. 16, 2005, pp. 65-69, vol. 29, No. 51, Tokyo, JP.

Video Quality Experts Group (http://www.its.bldrdoc.gov/vqeg/), Jun. 1999.

ITU-T recommendation P.862, Feb. 2001.

ITU-T recommendation J.144, Mar. 2004.

ITU-T recommendation P.911 Feb. 1998.

Hayashi et al., "Multi-Modal Quality Estimation Model based on Interaction of Audio and Video Quality", Proceedings of the 2004 IEICE General Conference, Communications 2, 2004.

Yamagishi et al., "A study on opinion model for quality assessment of interactive multimodal service", IEICE Technical Report, CQ2004-69 to 78, vol. 104, No. 309, 2004.

Hayashi et al., "Effects of Changes of Frame Rate on Subjective Video Quality", NTT R&D, vol. 46, No. 8, 1997, pp. 793-800.

* cited by examiner

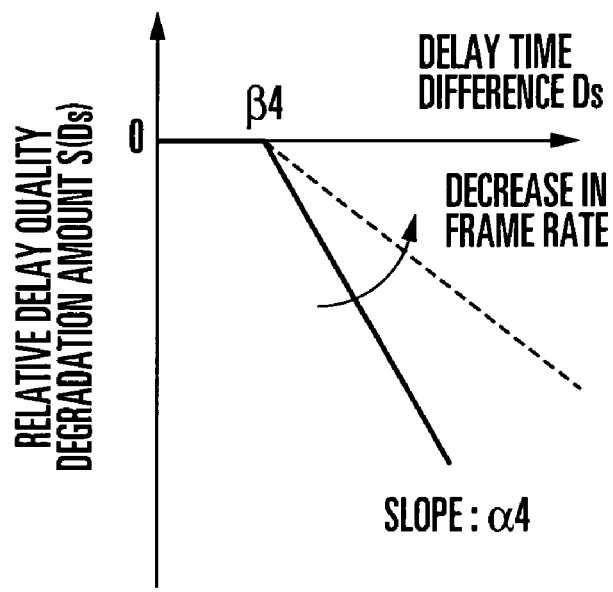
F I G. 20
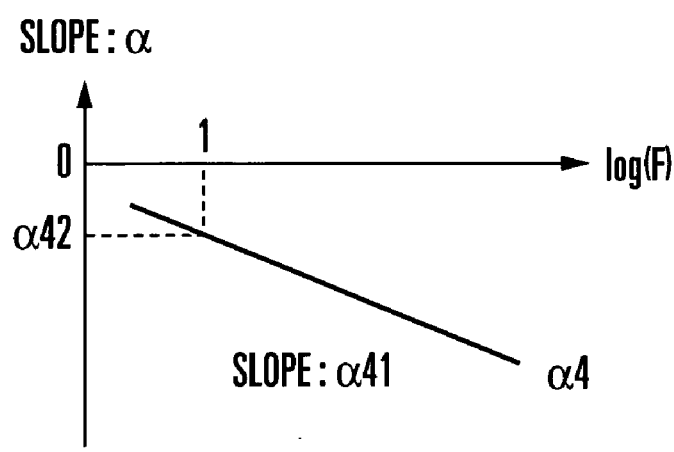
F I G. 21

VIDEO COMMUNICATION QUALITY ESTIMATION APPARATUS, METHOD, AND PROGRAM

The present patent application is a non-provisional application of International Application No. PCT/JP2006/317637, filed Sep. 6, 2006.

TECHNICAL FIELD

The present invention relates to a communication quality estimation technique and, more particularly, to a technique of estimating quality associated with video communication of bidirectionally exchanging audio and video media upon compositing them.

BACKGROUND ART

With advances in high-speed and broadband access lines to the Internet, attention has been paid to bidirectional multi-modal services based on the composition of audio and video media such as video communication services, e.g., video telephone/conference services, and collaboration services.

The Internet used for such services is a network which does not always guarantee the communication quality. For this reason, in communicating audio and video media upon compositing them, if the operating band of a communication line connecting user terminals is narrow or congestion occurs in the network, the quality of user experience of audio information and video information which the user actually feels on the receiving terminal degrades.

More specifically, the occurrence of quality degradation in audio information is perceived as breaks, noise, and a response delay, and the occurrence of quality degradation in video information is perceived as phenomena such as defocus, blur, mosaic-shaped distortion, jerky effect, and a response delay.

In some cases, a user perceives a response delay caused by the synchronization between audio and video media, i.e., a video communication service response delay, the step-out between audio and video media which is caused by a response time delay offset, or the like due to the processing time taken for the transmission of audio and video media signals, a delay time in the network, and a delay time originating from the processing time taken for the reception of audio and video media signals. In this case, the processing time taken for the transmission of audio and video media signals includes the processing time taken to encode audio and video media, a transmission buffer time, and the like. Delay times in the network include the processing time taken by a router and the like constituting a network, the time based on the physical distance between the networks used by communicators, and the like. In addition, the processing time taken for the reception of audio and video media signals includes a reception buffer time, the decoding time for audio and video media, and the like.

In order to provide such services with high quality, importance is placed on quality design before service provision and quality management after the start of a service. It is therefore necessary to develop a simple and efficient quality evaluation technique capable of appropriately expressing video quality enjoyed by users.

As an audio quality estimation technique, ITU-T recommendation P.862 (International Telecommunication Union-Telecommunication Standardization Sector) defines an objective audio quality evaluation scale PESQ (Perceptual Evaluation of Speech Quality). On the other hand, as a video quality estimation technique, an objective video quality evaluation scale is described in ITU-T recommendation J.144 and the like. There are continuing discussions about this subject in VQEG (Video Quality Experts Group) and the like (see, for example, www.its.bldrdoc.gov/vqeg/).

These objective quality evaluation techniques allow to estimate subjective quality with an estimation error equivalent to the statistical ambiguity of subjective quality under a predetermined condition. Under the circumstances, the present inventors have proposed a technique of obtaining a comprehensive quality evaluation scale for bidirectional multi-modal services such as video telephone/conference services in consideration of the quality of an individual medium such as an audio medium or video medium, which is obtained by the above objective quality evaluation scale or a subject quality evaluation experiment, and the influence of the transmission delay time of each medium (see, for example, Japanese Patent Laid-Open No. 2005-244321).

DISCLOSURE OF INVENTION

Problems to be Solved by the Invention

In a bidirectional multi-modal service such as a video telephone/conference service, step-out due to the absolute delay time from the input to the output of each medium and the relative delay time offset between media can be a factor that degrades the quality of the service. The above conventional techniques have a problem that no consideration is given to a quality estimation scale based on the comprehensive consideration of these quality factors. The degree of quality degradation due to step-out between media is greatly influenced by the frame rate of each frame obtained by encoding a video medium. In the prior art, however, since the frame rate is assumed to be constant at the standard value, i.e., 30 [frames/sec], if the frame rate differs from the standard value, the estimation accuracy of comprehensive quality degrades.

If, for example, the frame rate is low, even a relative offset between audio and video media is not perceived as large quality degradation. As the frame rate increases, however, the quality degradation becomes noticeable. As seen in a video telephone service or the like using recent cellular phones, there are many systems which cannot achieve a frame rate of 30 [frames/sec]. It is therefore a very important challenge to obtain comprehensive multi-modal quality in consideration of changes in frame rate.

As another related technique, for example, a method of obtaining comprehensive quality from audio quality and video quality has been proposed (see, for example, Japanese Patent Laid-Open No. 8-289333 and PCT (WO) 2004-523978). This method is premised on a broadcast or distribution service of unidirectional audio and video media such as TV broadcast. The method cannot solve the above problem because of the lack of consideration of bidirectionality, i.e., delay times and step-out between media. There has also been proposed a technique of estimating comprehensive quality in consideration of the quality of audio and video media and step-out between the two media (see, for example, PCT (WO) 2002-519960). This method cannot solve the above problem, either, because of the lack of consideration of bidirectionality, i.e., delay times.

In addition, a framework for obtaining comprehensive quality in consideration of the quality of audio and video media and delay times and step-out between them has been proposed (see, for example, Japanese Patent Laid-Open No. 2006-128972). As described above, for example, there is left a problem that no consideration can be given to the interaction between the influence of step-out between media and a decrease in frame rate. On the other hand, a quality evaluation system for audio and video signals has been proposed (see, for example, Japanese Patent Laid-Open No. 2001-298428), but this makes no reference to how to handle audio quality and video quality enjoyed by a user so as to derive comprehensive quality.

The present invention has been made to solve this problem, and has as its object to provide a video communication quality estimation apparatus, method, and program which can estimate, with sufficient accuracy, quality associated with video communication of bidirectionally exchanging audio and video media upon compositing them.

Means of Solution to the Problems

In order to achieve the above object, a video communication quality estimation apparatus according to the present invention which estimates quality associated with video communication of bidirectionally exchanging an audio medium and a video medium upon compositing the audio medium and the video medium between communication terminals connected via a network comprises a multi-modal quality estimation unit which estimates a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a quality evaluation value of the video medium, a delay quality degradation amount estimation unit which estimates a delay quality degradation amount caused by an audio medium delay and a video medium delay on the basis of an audio delay time as a delay time from input of an audio medium to output of the audio medium between communication terminals and a video delay time as a delay time from input of a video medium to output of the video medium between the communication terminals, and a video communication quality estimation unit which estimates quality of the video communication on the basis of the multi-modal quality value estimated by the multi-modal quality estimation unit and the delay quality degradation amount estimated by the delay quality degradation amount estimation unit.

In addition, a video communication quality estimation method according to the present invention used for a video communication quality estimation apparatus which estimates quality associated with video communication of bidirectionally exchanging an audio medium and a video medium upon compositing the audio medium and the video medium between communication terminals connected via a network comprises a multi-modal quality estimation step of causing a multi-modal quality estimation unit to estimate a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a quality evaluation value of the video medium, an absolute delay quality degradation amount estimation step of causing a delay quality degradation amount estimation unit to estimate a delay quality degradation amount caused by an audio medium delay and a video medium delay on the basis of an audio delay time as a delay time from input of an audio medium to output of the audio medium between communication terminals and a video delay time as a delay time from input of a video medium to output of the video medium between the communication terminals, and a video communication quality estimation step of causing a video communication quality estimation unit to estimate quality of the video communication on the basis of the multi-modal quality value estimated by the multi-modal quality estimation unit and the delay quality degradation amount estimated by the delay quality degradation amount estimation unit.

Furthermore, a program according to the present invention causes a computer of a video communication quality estimation apparatus which estimates quality associated with video communication of bidirectionally exchanging an audio medium and a video medium upon compositing the audio medium and the video medium between communication terminals connected via a network to execute a multi-modal quality estimation step of causing a multi-modal quality estimation unit to estimate a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a quality evaluation value of the video medium, an absolute delay quality degradation amount estimation step of causing a delay quality degradation amount estimation unit to estimate a delay quality degradation amount caused by an audio medium delay and a video medium delay on the basis of an audio delay time as a delay time from input of an audio medium to output of the audio medium between communication terminals and a video delay time as a delay time from input of a video medium to output of the video medium between the communication terminals, and a video communication quality estimation step of causing a video communication quality estimation unit to estimate quality of the video communication on the basis of the multi-modal quality value estimated by the multi-modal quality estimation unit and the delay quality degradation amount estimated by the delay quality degradation amount estimation unit.

Effects of the Invention

According to the present invention, the multi-modal quality estimation unit estimates a multi-modal quality value on the basis of an audio quality evaluation value and a video quality evaluation value, and the delay quality degradation amount estimation unit estimates a delay quality degradation amount on the basis of an audio delay time and a video delay time. The video communication quality estimation unit estimates a video communication quality value on the basis of the multi-modal quality value and the delay quality degradation amount. This makes it possible to estimate a video communication quality value in consideration of quality degradation due to the delays of audio and video media, and hence to estimate, with sufficient accuracy, quality associated with video communication of bidirectionally exchanging audio and video media upon compositing them.

BRIEF DESCRIPTION OF DRAWINGS

FIG. 20 is a graph showing an example of a characteristic of relative delay quality degradation amount estimation;

FIG. 21 is a graph showing an example of a characteristic of slope coefficient estimation;

BEST MODE FOR CARRYING OUT THE INVENTION

The embodiments of the present invention will be described next with reference to the accompanying drawings.

[First Embodiment]

Figure 1:
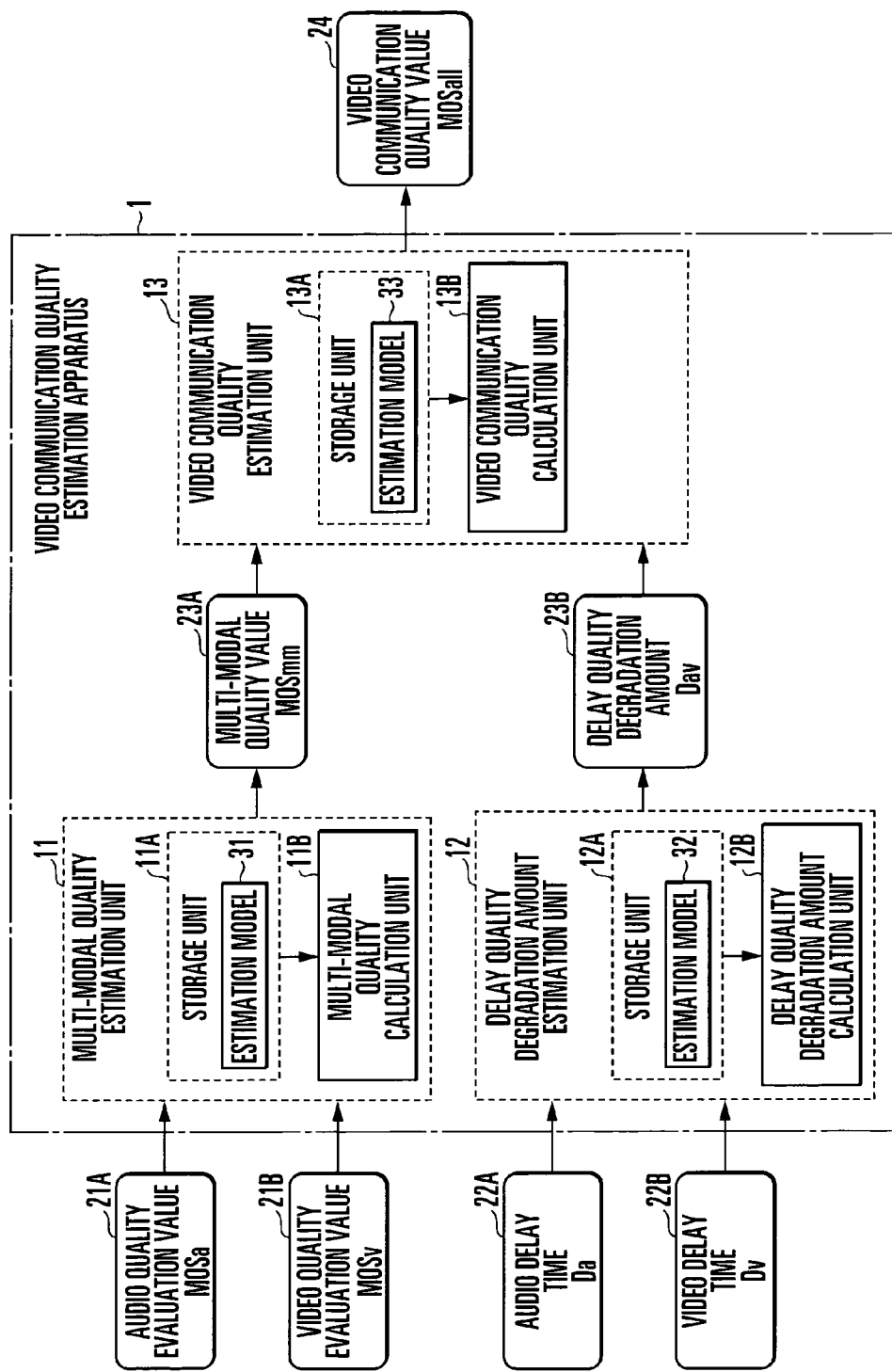
FIG. 1 is a block diagram showing the arrangement of a video communication quality estimation apparatus according to the first embodiment of the present invention.

A video communication quality estimation apparatus according to the first embodiment of the present invention will be described first with reference to FIG. 1. FIG. 1 is a block diagram showing the arrangement of the video communication quality estimation apparatus according to the first embodiment of the present invention.

A video communication quality estimation apparatus 1 comprises an information processing apparatus which performs arithmetic processing for input information and outputs the resultant information. This apparatus estimates quality associated with video communication of bidirectionally exchanging audio and video media upon compositing them between communication terminals connected via a network.

The video communication quality estimation apparatus 1 includes a multi-modal quality estimation unit 11, delay quality degradation amount estimation unit 12, and video communication quality estimation unit 13 as main functional units.

In this embodiment, the multi-modal quality estimation unit 11 estimates a multi-modal quality value 23A as the quality evaluation value of a composite medium obtained by compositing audio and video media on the basis of an audio quality evaluation value 21A as the quality evaluation value of an audio medium output from a communication terminal and a video quality evaluation value 21B as the quality evaluation value of a video medium output from the communication terminal.

The delay quality degradation amount estimation unit 12 estimates a delay quality degradation amount 23B originating from the delays of audio and video media on the basis of an audio delay time 22A as the delay time from the input to the output of an audio medium between communication terminals and a video delay time 22B as the delay time from the input to the output of a video medium between the communication terminals.

The video communication quality estimation unit 13 then estimates a video communication quality value 24 on the basis of the multi-modal quality value 23A estimated by the multi-modal quality estimation unit 11 and the delay quality degradation amount 23B estimated by the delay quality degradation amount estimation unit 12.

Each functional unit of the video communication quality estimation apparatus 1 will be described in detail next with reference to FIG. 1.

[Multi-Modal Quality Estimation Unit]

The multi-modal quality estimation unit 11 has a function of estimating the multi-modal quality value 23A as the quality evaluation value of a composite medium obtained by compositing audio and video media on the basis of the audio quality evaluation value 21A as the quality evaluation value of an audio medium output from the communication terminal and the video quality evaluation value 21B as the quality evaluation value of a video medium output from the communication terminal.

The multi-modal quality estimation unit 11 includes a storage unit 11A and a multi-modal quality calculation unit 11B as main functional means.

The storage unit 11A stores, in advance, a multi-modal quality estimation model 31 representing the relationship between the audio quality evaluation value 21A, video quality evaluation value 21B, and multi-modal quality value 23A.

The multi-modal quality calculation unit 11B has a function of calculating the multi-modal quality value 23A corresponding to the audio quality evaluation value 21A and video quality evaluation value 21B on the basis of the multi-modal quality estimation model 31 in the storage unit 11A.

The audio quality evaluation value 21A is quality of user experience which the user actually feels against the audio medium which is transmitted from one communication terminal and is received and played back by the other communication terminal. The video quality evaluation value 21B is quality of user experience which the user actually feels against the video medium which is transmitted from one communication terminal and is received and played back by the other communication terminal. These quality evaluation values can be obtained by evaluating or estimating an actually performed video communication.

[Delay Quality Degradation Amount Estimation Unit]

The delay quality degradation amount estimation unit 12 has a function of estimating the delay quality degradation amount 23B originating from the delays of audio and video media on the basis of the audio delay time 22A as the delay time from the input to the output of an audio medium between communication terminals and the video delay time 22B as the delay time from the input to the output of a video medium between the communication terminals.

The delay quality degradation amount estimation unit 12 includes a storage unit 12A and delay quality degradation amount calculation unit 12B as main functional means.

The storage unit 12A has a function of storing, in advance, a delay quality degradation amount estimation model 32 representing the relationship between the audio delay time 22A, video delay time 22B, and delay quality degradation amount 23B.

The delay quality degradation amount calculation unit 12B has a function of calculating the delay quality degradation amount 23B corresponding to the audio delay time 22A and video delay time 22B on the basis of the delay quality degradation amount estimation model 32 in the storage unit 12A.

The audio delay time 22A is the delay time from the input of an audio medium to one communication terminal to the output of the medium from the other communication terminal. The video delay time 22B is the delay time from the input of a video medium input to one communication terminal to the output of the medium from the other communication terminal.

Specific delay times constituting the audio delay time 22A and the video delay time 22B include processing times at the times of transmission of audio and video media, delay times in the network, and processing times at the time of reception of the audio and video media. In this case, the processing times at the time of audio and video media signals include the processing times taken to encode audio and video media, a transmission buffer time, and the like. Delay times in the network include the processing time of a router and the like constituting the network, the time based on the physical distance between the networks used by communicators, and the like. The processing times taken at the time of reception of audio and video media include a reception buffer time, the decoding times taken for the audio and video media, and the like.

In this embodiment, the delay quality degradation amount estimation model 32 representing the relationship between the audio delay time 22A, video delay time 22B, and delay quality degradation amount 23B is derived by tests and stored in the storage unit 12A in advance, and the delay quality degradation amount estimation unit 12 calculates the delay quality degradation amount 23B corresponding to the newly calculated audio delay time 22A and video delay time 22B on the basis of the delay quality degradation amount estimation model 32 in the storage unit 12A.

[Video Communication Quality Estimation Unit]

The video communication quality estimation unit 13 has a function of estimating the video communication quality value 24 implemented by a bidirectional multi-modal service in consideration of the multi-modal quality value 23A estimated by the multi-modal quality estimation unit 11 and the delay quality degradation amount 23B estimated by the delay quality degradation amount estimation unit 12.

The video communication quality estimation unit 13 includes a storage unit 13A and video communication quality calculation unit 13B as main functional means.

The storage unit 13A has a function of storing, in advance, the video communication quality estimation model 33 representing the relationship between the multi-modal quality value 23A, delay quality degradation amount 23B, and video communication quality value 24.

The video communication quality calculation unit 13B has a function of calculating the video communication quality value 24 corresponding to the multi-modal quality value 23A and delay quality degradation amount 23B on the basis of the video communication quality estimation model 33 in the storage unit 13A.

Of these functional units, the storage unit for various types of arithmetic processing data and programs comprises storage devices such as a memory and a hard disk. An arithmetic processing unit (computer) for performing various types of arithmetic processing comprises a CPU and its peripheral circuits. This unit implements various types of functional means by reading and executing programs (not shown) in the storage unit so as to make the above hardware and programs operate cooperatively. Note that the respective functional units can individually include storage units and arithmetic processing units or can share a storage unit and an arithmetic processing unit.

[Operation of First Embodiment]

The operation of the video communication quality estimation apparatus according to the first embodiment of the present invention will be described next in detail.

[Overall Processing Operation]

Figure 2:
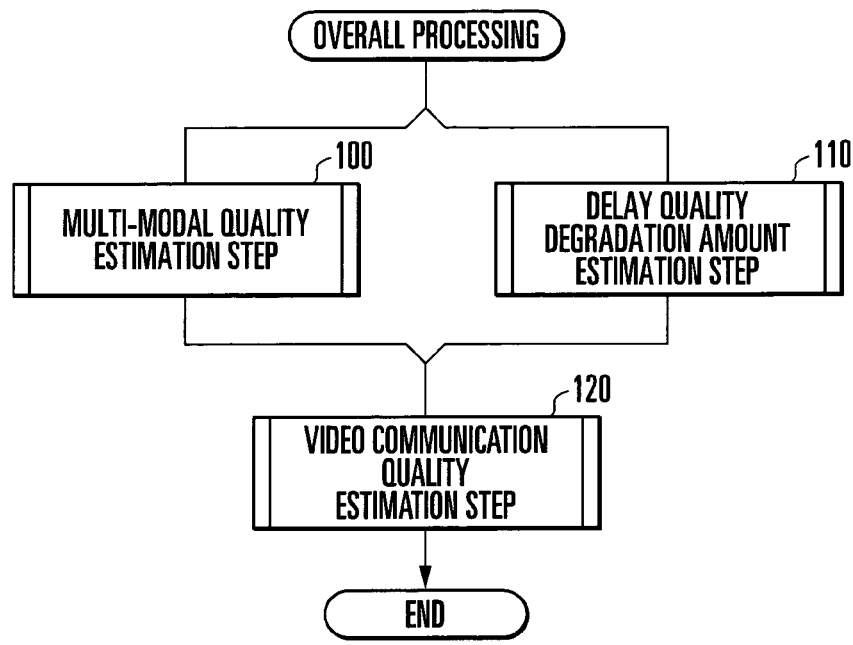
FIG. 2 is a flowchart showing the overall processing operation of the video communication quality estimation apparatus according to the first embodiment of the present invention.

The video communication quality estimation operation of the video communication quality estimation apparatus according to the first embodiment of the present invention will be described first with reference to FIG. 2. FIG. 2 is a flowchart showing the overall processing operation of the video communication quality estimation apparatus according to the first embodiment of the present invention.

Assume that the audio quality evaluation value 21A, video quality evaluation value 21B, audio delay time 22A, and video delay time 22B have been input as pieces of quality information about an arbitrary video communication performed between communication terminals from an external apparatus, storage medium, communication network, or keyboard (not shown). A case in which a quality value concerning the video communication is estimated on the basis of these pieces of quality information will be described.

The video communication quality estimation apparatus 1 starts the overall processing in FIG. 2 in response to the input of quality information or operator's operation representing the start of execution.

First of all, the video communication quality estimation apparatus 1 causes the multi-modal quality estimation unit 11 to estimate the multi-modal quality value 23A corresponding to the audio quality evaluation value 21A and video quality evaluation value 21B by executing the multi-modal quality estimation step (step 100).

In parallel with this operation, the video communication quality estimation apparatus 1 causes the delay quality degradation amount estimation unit 12 to estimate the delay quality degradation amount 23B corresponding to the audio delay time 22A and video delay time 22B by executing the delay quality degradation amount estimation step (step 110).

The video communication quality estimation apparatus 1 then causes the video communication quality estimation unit 13 to estimate the video communication quality value 24 corresponding to the multi-modal quality value 23A and delay quality degradation amount 23B by executing the video communication quality estimation step (step 120), and terminates the series of overall processing operations.

Note that the multi-modal quality estimation step and the delay quality degradation amount estimation step can be executed concurrently or sequentially.

[Multi-Modal Quality Estimation Operation]

Figure 3:
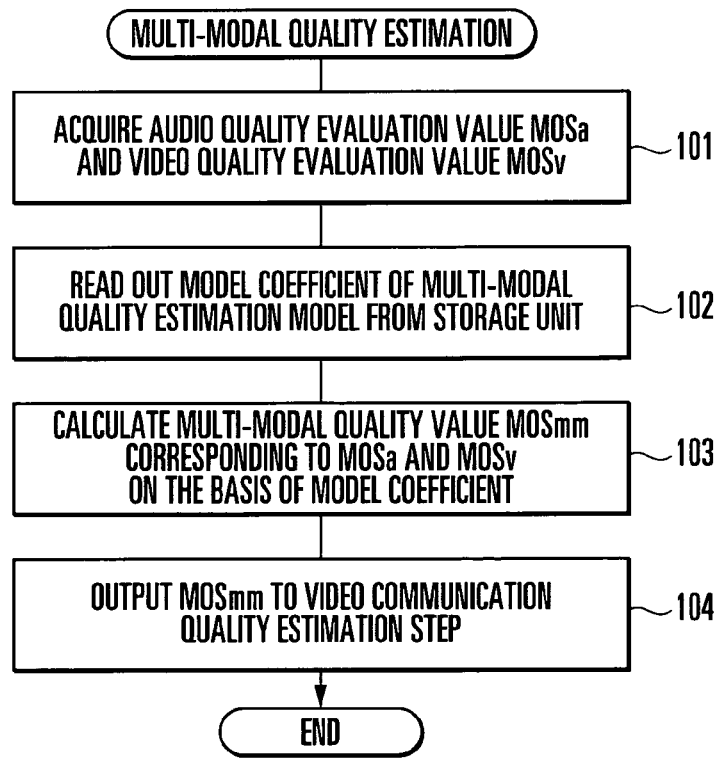
FIG. 3 is a flowchart showing multi-modal quality estimation processing by the video communication quality estimation apparatus according to the first embodiment of the present invention.

The multi-modal quality estimation operation of the video communication quality estimation apparatus according to the first embodiment of the present invention will be described next with reference to FIG. 3. FIG. 3 is a flowchart showing the multi-modal quality estimation processing by the video communication quality estimation apparatus according to the first embodiment of the present invention.

The multi-modal quality estimation unit 11 of the video communication quality estimation apparatus 1 executes the multi-modal quality estimation processing in FIG. 3 in the multi-modal quality estimation step in step 100 in FIG. 2.

First of all, the multi-modal quality estimation unit 11 causes the multi-modal quality calculation unit 11B to acquire the externally input audio quality evaluation value 21A and video quality evaluation value 21B (step 101). The multi-modal quality calculation unit 11B reads out a model coefficient representing the multi-modal quality estimation model 31 from the storage unit 11A (step 102), and calculates the multi-modal quality value 23A corresponding to the audio quality evaluation value 21A and video quality evaluation value 21B on the basis of the multi-modal quality estimation model 31 (step 103).

Figure 4:
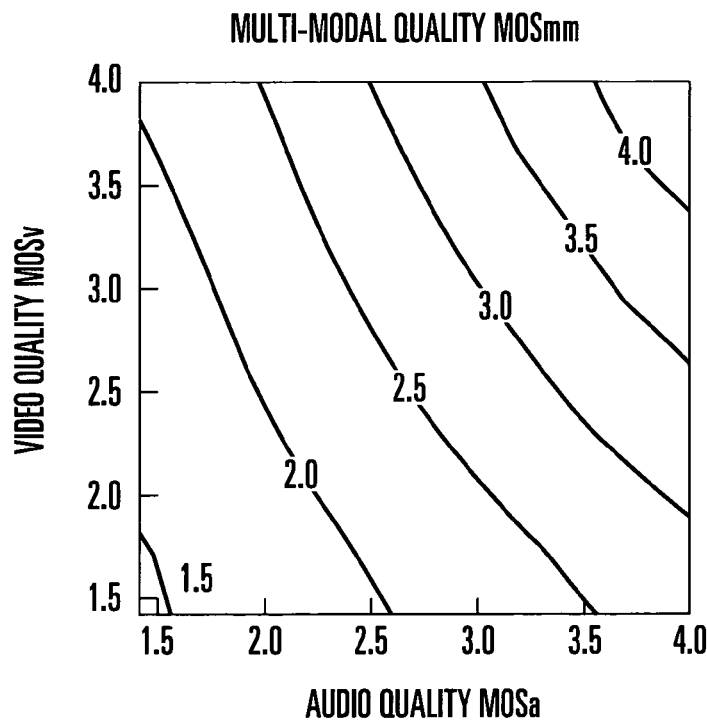
FIG. 4 is a graph showing an example of a characteristic of a multi-modal quality estimation model.

FIG. 4 shows an example of a characteristic of the multi-modal quality estimation model. In the present invention, of the qualities associated with video communication of bidirectionally exchanging audio and video media upon compositing them, the quality without any consideration of quality degradation due to the delays of audio and video media will be referred to as the multi-modal quality value 23A.

As shown in FIG. 4, the multi-modal quality value 23A tends to monotonically increase with an increase in a video quality evaluation value MOSv when an audio quality evaluation value MOSa is constant, and to monotonically increase with an increase in the audio quality evaluation value MOSa when the video quality evaluation value MOSv is constant.

The multi-modal quality value 23A can therefore be expressed by a mathematical expression representing the interaction between the audio quality evaluation value 21A and the video quality evaluation value 21B. Letting MOSa be the audio quality evaluation value 21A, MOSv be the video quality evaluation value 21B, $\alpha 1$, $\beta 1$, $\gamma 1$, and $\delta 1$ be constants, and MOSmm be the multi-modal quality value 23A, MOSmm can be estimated by $$MOSmm = \alpha 1 \cdot MOSa + \beta 1 \cdot MOSv + \gamma 1 \cdot MOSa \cdot MOSv + \delta 1 \quad (1)$$

At this time, the multi-modal quality value 23A is normalized to be represented by a standard MOS (Mean Opinion Score) value taking a numerical value from 1 to 5. Letting min(a, b) be a function of selecting a smaller one of values a and b, and max(a, b) be a function of selecting a larger one of the values a and b, MOSmm can be normalized by $$MOSmm = \min\{5, \max(MOSmm, 1)\} \quad (2)$$

The multi-modal quality calculation unit 11B then outputs the calculated multi-modal quality value 23A to the video communication quality estimation unit 13 (step 104), and terminates the series of multi-modal quality estimation processing.

[Delay Quality Degradation Amount Estimation Operation]

Figure 5:
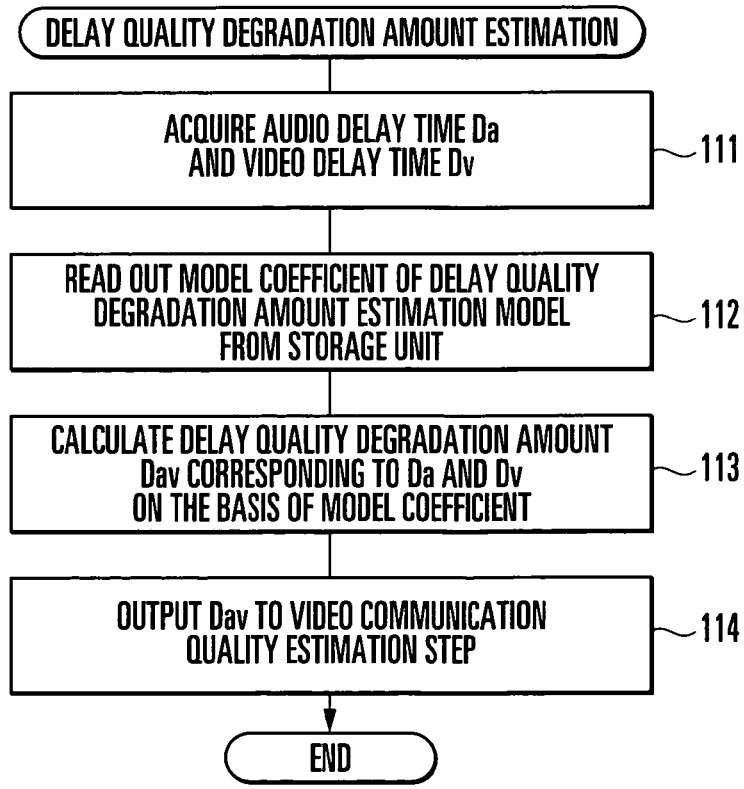
FIG. 5 is a flowchart showing delay quality degradation amount estimation processing by the video communication quality estimation apparatus according to the first embodiment of the present invention.

The delay quality degradation amount estimation operation of the video communication quality estimation apparatus according to the first embodiment of the present invention will be described next. FIG. 5 is a flowchart showing delay quality degradation amount estimation processing by the video communication quality estimation apparatus according to the first embodiment of the present invention.

The delay quality degradation amount estimation unit 12 of the video communication quality estimation apparatus 1 executes the delay quality degradation amount estimation processing in FIG. 5 in the delay quality degradation amount estimation step in step 110 in FIG. 2.

First of all, the delay quality degradation amount estimation unit 12 acquires the externally input audio delay time 22A and video delay time 22B from the delay quality degradation amount calculation unit 12B (step 111). The delay quality degradation amount calculation unit 12B reads out a model coefficient representing the delay quality degradation amount estimation model 32 from the storage unit 12A (step 112), and calculates the delay quality degradation amount 23B corresponding to the audio delay time 22A and video delay time 22B on the basis of the delay quality degradation amount estimation model 32 (step 113).

Figure 6:
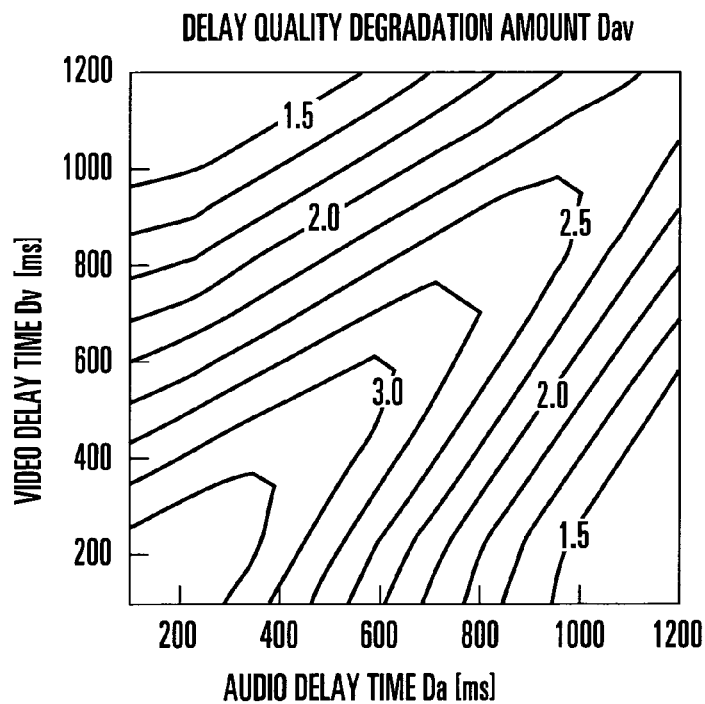
FIG. 6 is a graph showing an example of a characteristic of a delay quality degradation amount estimation model.

FIG. 6 shows an example of a characteristic of a delay quality degradation amount estimation model. In the present invention, of the qualities associated with video communication of bidirectionally exchanging audio and video media upon compositing them, a quality degradation amount due to the delays of the audio and video media will be referred to as the delay quality degradation amount 23B.

As shown in FIG. 6, a delay quality degradation amount Dav has a convex characteristic that it monotonically increases to reach a predetermined maximum value with an increase in a video delay time Dv, and monotonically decreases with a further increase in the video delay time Dv, when an audio delay time Da is constant.

In addition, the delay quality degradation amount Dav has a convex characteristic that it monotonically increases to reach a predetermined maximum value with an increase in an audio delay time Da, and monotonically decreases with a further increase in the audio delay time Da, when the video delay time Dv is constant.

The delay quality degradation amount 23B can therefore be expressed by a function expression with the audio delay time 22A and video delay time 22B as variables. Letting Da be the audio delay time 22A, Dv be the video delay time 22B, f(Da, Dv) be a function expression representing the relationship between the audio delay time 22A, video delay time 22B, and delay quality degradation amount 23B, min(a, b) be a function of selecting a smaller one of values a and b, max(a, b) be a function of selecting a larger one of the values a and b, and Dav be the delay quality degradation amount 23B, Dav normalized to the MOS value range of 1 to 5 can be estimated by $$Dav=\min[5,\max\{f(Da,Dv),1\}] \quad (3)$$

The delay quality degradation amount calculation unit 12B then outputs the calculated delay quality degradation amount 23B to the video communication quality estimation unit 13 (step 114), and terminates the series of delay quality degradation amount estimation processing.

[Video Communication Quality Estimation]

Figure 7:
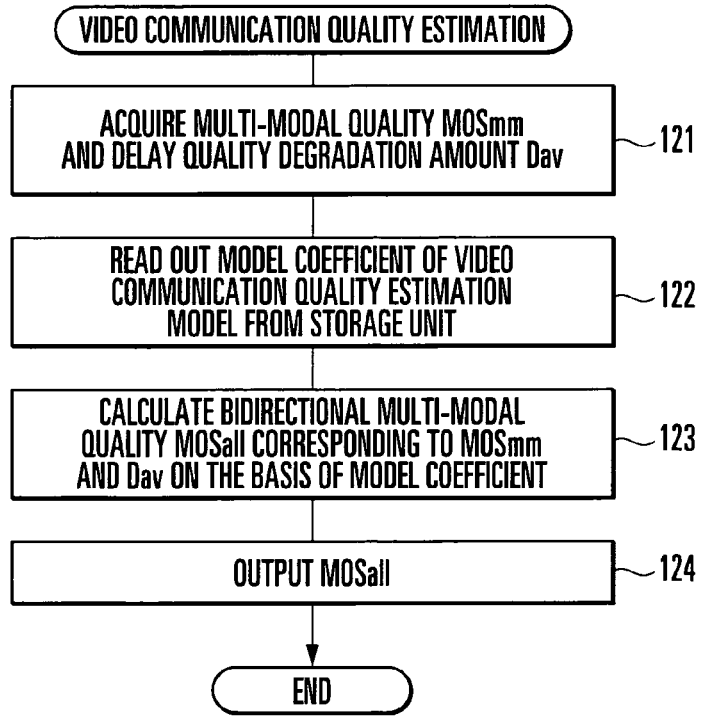
FIG. 7 is a flowchart showing video communication quality estimation processing by the video communication quality estimation apparatus according to the first embodiment of the present invention.

The multi-modal quality estimation operation of the video communication quality estimation apparatus according to the first embodiment of the present invention will be described next with reference to FIG. 7. FIG. 7 is a flowchart showing video communication quality estimation processing by the video communication quality estimation apparatus according to the first embodiment of the present invention.

The video communication quality estimation unit 13 of the video communication quality estimation apparatus 1 executes the video communication quality estimation processing in FIG. 7 in the video communication quality estimation step in step 120 in FIG. 2.

First of all, the video communication quality estimation unit 13 causes the video communication quality calculation unit 13B to acquire the multi-modal quality value 23A estimated by the multi-modal quality estimation unit 11 and the delay quality degradation amount 23B estimated by the delay quality degradation amount estimation unit 12 (step 121). The video communication quality calculation unit 13B then reads out a model coefficient representing a video communication quality estimation model 33 from the storage unit 13A (step 122), and calculates the video communication quality value 24 corresponding to the multi-modal quality value 23A and delay quality degradation amount 23B on the basis of the video communication quality estimation model 33 (step 123).

Figure 8:
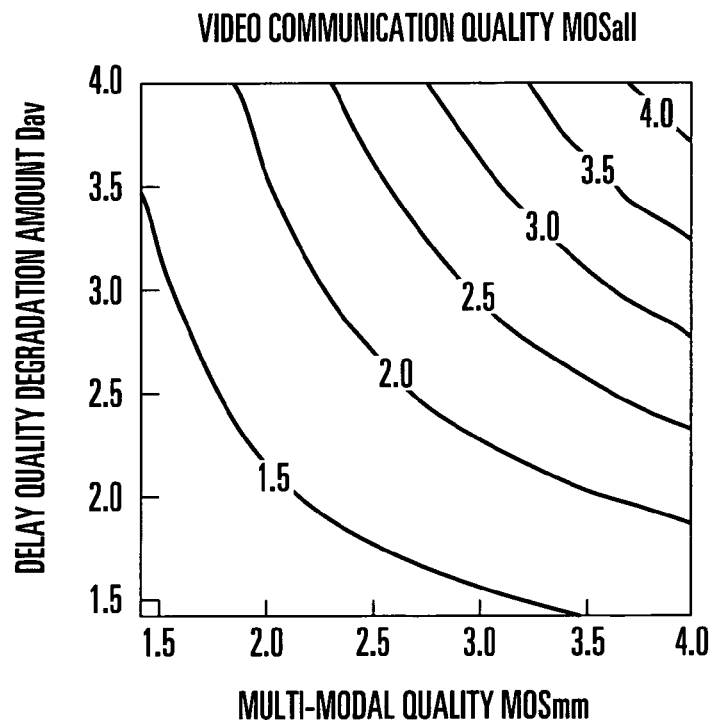
FIG. 8 is a graph showing an example of a characteristic of a video communication quality estimation model.

FIG. 8 shows an example of a characteristic of a video communication quality estimation model. In the present invention, of the qualities associated with video communication of bidirectionally exchanging audio and video media upon compositing them, the quality based on the consideration of a quality degradation amount due to the delays of the audio and video media will be referred to as the video communication quality value 24.

As shown in FIG. 8, a video communication quality value MOSall tends to monotonically increase with an increase in a delay quality degradation amount Dav when the multi-modal quality value MOSmm is constant, and to monotonically increase with an increase in a multi-modal quality value MOSmm when the delay quality degradation amount Dav is constant.

The video communication quality value 24 can therefore be expressed by a mathematical expression representing the interaction between the multi-modal quality value 23A and the delay quality degradation amount 23B. Letting MOSmm be the multi-modal quality value 23A, Dav be the delay quality degradation amount 23B, α2, β2, γ2, and δ2 be constants, and MOSall be the video communication quality value 24, MOSall can be estimated by $$MOSall=\alpha 2 \cdot MOSmm+\beta 2 \cdot Dav+\gamma 2 \cdot MOSmm \cdot Dav+\delta 2 \quad (4)$$

At this time, the video communication quality value 24 is normalized to be represented by a standard MOS value taking a numerical value from 1 to 5. Letting min(a, b) be a function of selecting a smaller one of values a and b, and max(a, b) be a function of selecting a larger one of the values a and b, MOSall can be normalized by $$MOSall=\min\{5,\max(MOSall,1)\} \quad (5)$$

The video communication quality calculation unit 13B then outputs the calculated video communication quality value 24 to a unit outside the apparatus, recording medium, communication network, storage unit, or display screen (not shown) (step 124), and terminates the series of video communication quality estimation processing.

In this manner, according to this embodiment, the multi-modal quality estimation unit 11 estimates the multi-modal quality value 23A on the basis of the audio quality evaluation value 21A and the video quality evaluation value 21B. In addition, the delay quality degradation amount estimation unit 12 estimates the delay quality degradation amount 23B on the basis of the audio delay time 22A and the video delay time 22B, and the video communication quality estimation unit 13 estimates the video communication quality value 24 on the basis of the multi-modal quality value 23A and the delay quality degradation amount 23B. This makes it possible to estimate the video communication quality value 24 in consideration of the quality estimation values of individual media of audio and video media and quality degradation due to the delays of the audio and video media, and hence to estimate, with high accuracy, quality associated with video communication of bidirectionally exchanging audio and video media upon compositing them.

The delay quality degradation amount estimation unit 12 also estimates the delay quality degradation amount 23B corresponding to the audio delay time 22A and video delay time 22B on the basis of the delay quality degradation amount estimation model 32 representing the relationship between the audio delay time, the video delay time, and the delay quality degradation amount. This makes it possible to accurately and easily estimate the delay quality degradation amount 23B.

Figure 9:
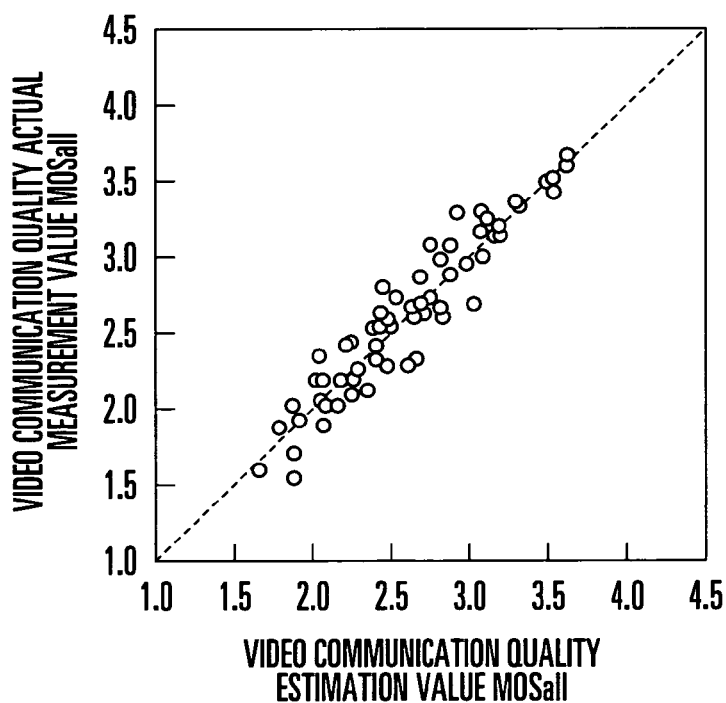
FIG. 9 is a graph showing estimation results on video communication quality estimation values obtained in this embodiment.

FIG. 9 is a graph showing estimation results on video communication quality estimation values obtained in this embodiment. Referring to FIG. 9, the abscissa represents the video communication quality estimation values (MOS values) obtained in this embodiment; and the ordinate, the video communication quality actual measurement values (MOS values) as results on the respective video communications as estimation targets by actual opinion evaluation.

The video communication quality estimation values obtained in this embodiment and the actual measurement values are plotted on the diagonal line on the graph. In this case, the determination coefficient is 0.91, which indicates that a high correlation is obtained. The average of the 95% confidence interval of the actual measurement values is 0.31, whereas the RMSE (Root Mean Square Error) of the estimated values is 0.16. This indicates that the estimated values have satisfactory estimation accuracy in a practical term.

In addition, this embodiment uses the delay quality degradation amount estimation model 32, which has a convex characteristic that when the audio delay time Da is constant, the delay quality degradation amount Dav monotonically increases to reach a predetermined maximum value with an increase in a video delay time Dv, and monotonically decreases with a further increase in the video delay time Dv, and a convex characteristic that when the video delay time Dv is constant, the delay quality degradation amount Dav monotonically increases to reach a predetermined maximum value with an increase in an audio delay time Da, and monotonically decreases with a further increase in the audio delay time Da. This makes it possible to accurately and easily estimate a quality degradation amount corresponding to the human visual and auditory characteristics associated with quality degradation due to the delays of audio and video media.

[Second Embodiment]

Figure 10:
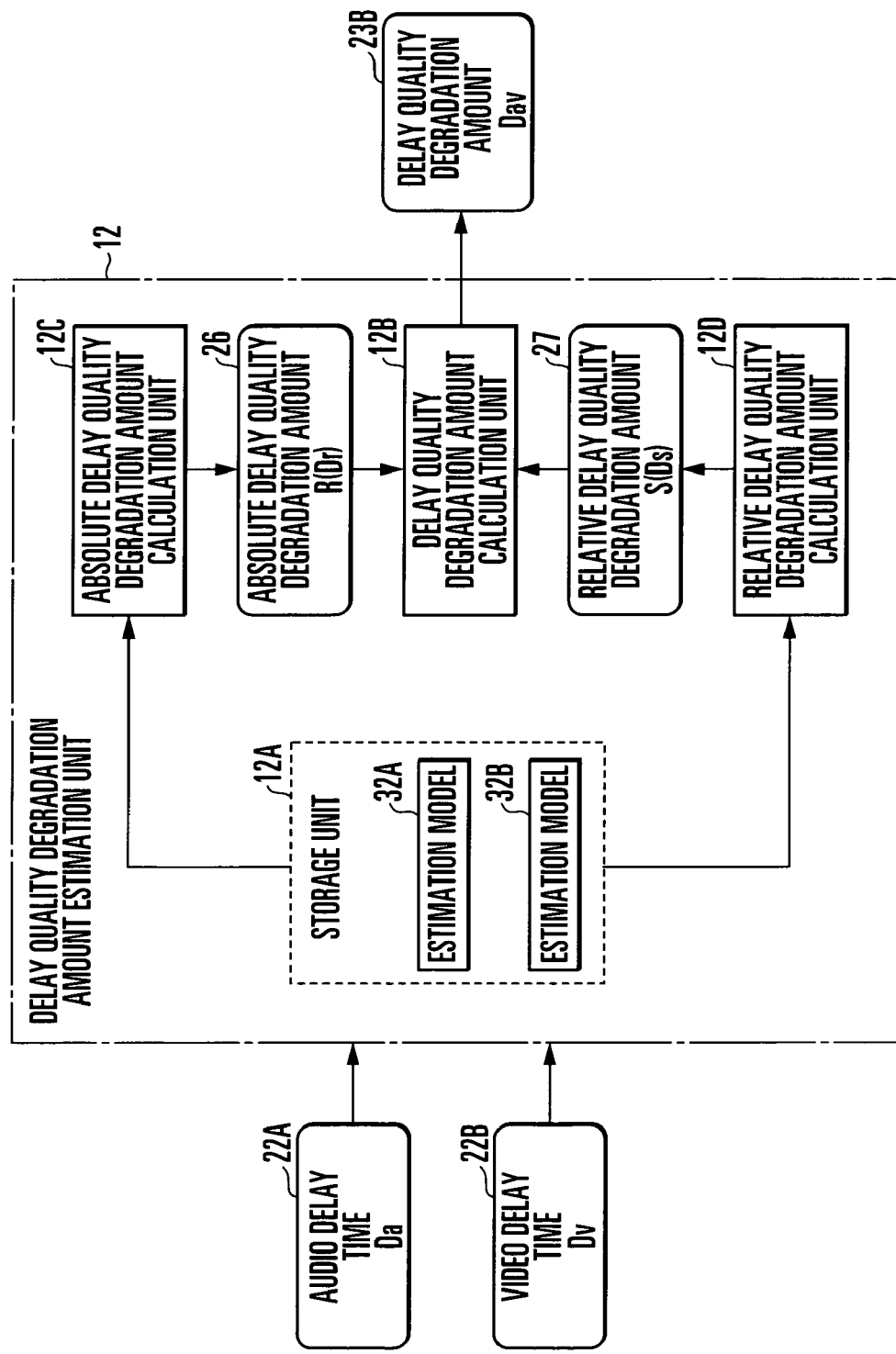
FIG. 10 is a block diagram showing the arrangement of the main part of a video communication quality estimation apparatus according to the second embodiment of the present invention.

A video communication quality estimation apparatus according to the second embodiment of the present invention will be described next with reference to FIG. 10. FIG. 10 is a block diagram showing the arrangement of the main part of the video communication quality estimation apparatus according to the second embodiment of the present invention. The same reference numerals as in FIG. 1 described above denote the same or similar parts in FIG. 10.

In the first embodiment, when estimating the delay quality degradation amount 23B corresponding to the audio delay time 22A and video delay time 22B, the delay quality degradation amount estimation unit 12 directly estimates the delay quality degradation amount 23B on the basis of the delay quality degradation amount estimation model 32 representing the relationship between an audio delay time, a video delay time, and a delay quality degradation amount.

This embodiment exemplifies a case in which an absolute delay quality degradation amount representing quality degradation due to the absolute delays of audio and video media and a relative delay quality degradation amount representing a quality degradation due to the relative delays of the audio and video media are obtained from an audio delay time 22A and a video delay time 22B, and a delay quality degradation amount 23B is indirectly estimated from the absolute delay quality degradation amount and the relative degradation quality degradation amount.

Note that the arrangement of a video communication quality estimation apparatus 1 according to this embodiment differs from that according to the first embodiment (see FIG. 1) only in a delay quality degradation amount estimation unit 12. Other arrangements are the same as those of the first embodiment, and a detailed description thereof will be omitted.

[Delay Quality Degradation Amount Estimation Unit]

As shown in FIG. 10, the delay quality degradation amount estimation unit 12 includes a storage unit 12A, delay quality degradation amount calculation unit 12B, absolute delay quality degradation amount calculation unit 12C, and delay quality degradation amount calculation unit 12D as main functional means.

The storage unit 12A has a function of storing, in advance, an absolute delay quality degradation amount estimation model 32A representing the relationship between the delay time sum of the audio delay time 22A and the video delay time 22B and an absolute delay quality degradation amount 26 and a relative delay quality degradation amount estimation model 32B representing the relationship between a relative delay quality degradation amount 27 and the delay time difference between the audio delay time 22A and the video delay time 22B.

The absolute delay quality degradation amount calculation unit 12C has a function of calculating the absolute delay quality degradation amount 26 corresponding to the delay time sum of the audio delay time 22A and the video delay time 22B on the basis of the absolute delay quality degradation amount estimation model 32A in the storage unit 12A.

The delay quality degradation amount calculation unit 12D has a function of calculating the relative delay quality degradation amount 27 corresponding to the delay time difference between the audio delay time 22A and the video delay time 22B on the basis of the relative delay quality degradation amount estimation model 32B in the storage unit 12A.

The delay quality degradation amount calculation unit 12B has a function of calculating the delay quality degradation amount 23B corresponding to the audio delay time 22A and video delay time 22B on the basis of the absolute delay quality degradation amount 26 calculated by the absolute delay quality degradation amount calculation unit 12C and the relative delay quality degradation amount 27 calculated by the delay quality degradation amount calculation unit 12D.

An absolute degradation quality degradation amount is a quality degradation amount originating from the absolute delays of audio and video media. A relative degradation quality degradation amount is a quality degradation amount originating from the relative delay difference between of the audio and video media.

In video communication of bidirectionally exchanging audio and video media upon compositing them, when audio and video media are exchanged between communication terminals, the user perceives quality degradations of the media in accordance with the absolute delays caused between the communication terminals. In this embodiment, such a quality degradation amount is defined as the absolute delay quality degradation amount 26. The absolute delay quality degradation amount calculation unit 12C estimates the absolute delay quality degradation amount 26 on the basis of the absolute delay quality degradation amount estimation model 32A representing a characteristic that the absolute delay quality degradation amount monotonically increases with an increase in the delay time sum of an audio delay time and a video delay time.

In video communication of bidirectionally exchanging audio and video media upon compositing them, when the audio and video media are exchanged between the communication terminals, the user perceives quality degradations of these media in accordance with the relative delay caused between the communication terminals, i.e., the step-out (playback timing offset) between the media. In this embodiment, such a quality degradation amount is defined as the relative delay quality degradation amount 27. The delay quality degradation amount calculation unit 12D estimates the relative delay quality degradation amount 27 on the basis of the relative delay quality degradation amount estimation model 32B representing a characteristic that a relative delay quality degradation amount monotonically increases with an increase in the delay time difference between an audio delay time and a video delay time.

Of these functional units, the storage unit for various types of arithmetic processing data and programs comprises storage devices such as a memory and a hard disk. An arithmetic processing unit (computer) for performing various types of arithmetic processing comprises a CPU and its peripheral circuits. This unit implements various types of functional means by reading and executing programs (not shown) in the storage unit so as to make the above hardware and programs operate cooperatively. Note that the respective functional units can individually include storage units and arithmetic processing units or can share a storage unit and an arithmetic processing unit.

[Operation of Second Embodiment]

Figure 11:
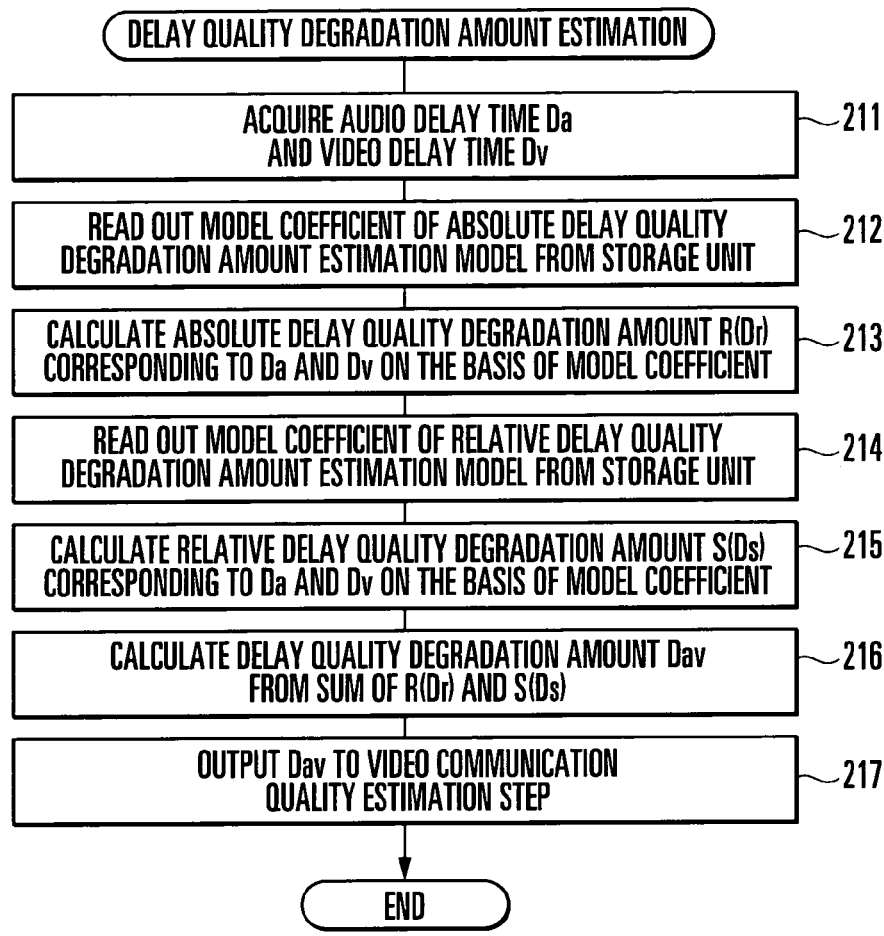
FIG. 11 is a flowchart showing delay quality degradation amount estimation processing by the video communication quality estimation apparatus according to the second embodiment of the present invention.

Of the operations performed by the video communication quality estimation apparatus according to the second embodiment of the present invention, the delay quality degradation amount estimation operation will be described in detail next with reference to FIG. 11. FIG. 11 is a flowchart showing delay quality degradation amount estimation processing by the video communication quality estimation apparatus according to the second embodiment of the present invention. The operations of the video communication quality estimation apparatus 1 according to this embodiment differ from those according to the first embodiment in only delay quality degradation amount estimation operation. Other processing operations are the same as those of the first embodiment, and hence a detailed description thereof will be omitted.

The delay quality degradation amount estimation unit 12 of the video communication quality estimation apparatus 1 executes the delay quality degradation amount estimation processing in FIG. 11 in the delay quality degradation amount estimation step in step 110 in FIG. 2.

First of all, the delay quality degradation amount estimation unit 12 acquires the externally input audio delay time 22A and video delay time 22B from the delay quality degradation amount calculation unit 12B (step 211). The delay quality degradation amount estimation unit 12 then causes the absolute delay quality degradation amount calculation unit 12C to read out a model coefficient representing the absolute delay quality degradation amount estimation model 32A from the storage unit 12A (step 212) and calculate the absolute delay quality degradation amount 26 corresponding to the delay time sum of the audio delay time 22A and the video delay time 22B on the basis of the absolute delay quality degradation amount estimation model 32A (step 213).

Figure 12:
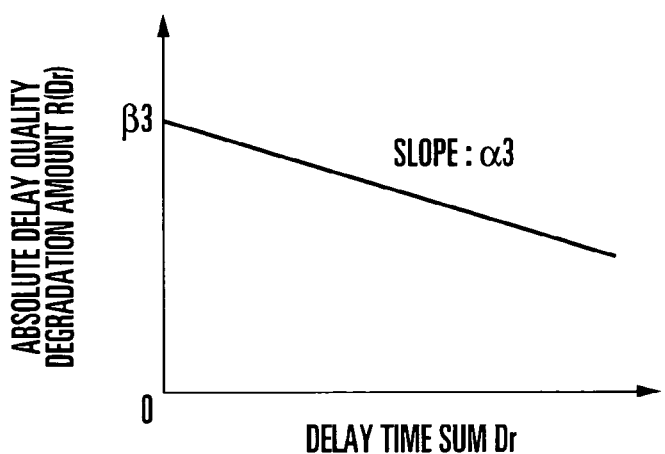
FIG. 12 is a graph showing an example of a characteristic of absolute delay quality degradation amount estimation.

FIG. 12 shows an example of a characteristic of absolute delay quality degradation amount estimation. In the present invention, of the qualities associated with video communication of bidirectionally exchanging audio and video media upon compositing them, the quality degradation component which changes in accordance with the delay time sum of the audio delay time 22A and the video delay time 22B will be referred to as the absolute delay quality degradation amount 26.

As shown in FIG. 12, the absolute delay quality degradation amount 26 tends to monotonically increase with an increase in a delay time sum Dr of an audio delay time Da and a video delay time Dv.

The absolute delay quality degradation amount 26 can therefore be expressed by a linear function expression using the delay time sum of the audio delay time 22A and the video delay time 22B as a variable. Letting Da be the audio delay time 22A, Dv be the video delay time 22B, and Dr be a delay time sum, Dr is obtained by $$Dr = Da + Dv \quad (6)$$

Letting $\alpha 3$ and $\beta 3$ be constants and R(Dr) be the absolute delay quality degradation amount 26, R(Dr) can be estimated by $$R(Dr) = \alpha 3 \cdot Dr + \beta 3 \quad (7)$$

The delay quality degradation amount estimation unit 12 causes the delay quality degradation amount calculation unit 12D to read out a model coefficient representing the relative delay quality degradation amount estimation model 32B from the storage unit 12A (step 214) and calculate the relative delay quality degradation amount 27 corresponding to the delay time difference between the audio delay time 22A and the video delay time 22B on the basis of the relative delay quality degradation amount estimation model 32B (step 215).

Figure 13:
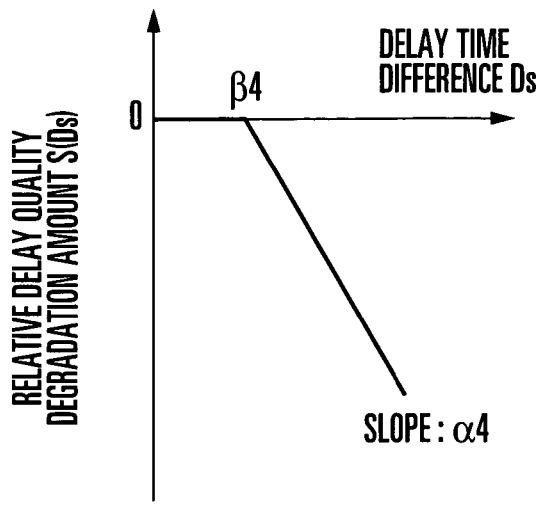
FIG. 13 is a graph showing an example of a characteristic of relative delay degradation amount estimation.

FIG. 13 shows an example of a characteristic of relative delay quality degradation amount estimation. In the present invention, of the qualities associated with video communication of bidirectionally exchanging audio and video media upon compositing them, the quality degradation component which changes in accordance with the delay time difference between the audio delay time 22A and the video delay time 22B will be referred to as the relative delay quality degradation amount 27.

As shown in FIG. 13, the relative delay quality degradation amount 27 tends to indicate 0 until a delay time difference Ds between the audio delay time Da and the video delay time Dv reaches a predetermined value and monotonically decrease with a further increase in the delay time difference Ds.

The relative delay quality degradation amount 27 can therefore be expressed by a linear function expression using the delay time difference between the audio delay time 22A and the video delay time 22B as a variable. Letting Da be the audio delay time 22A, Dv be the video delay time 22B, and Ds be a delay time difference, Ds can be obtained by $$Ds = Da - Dv \quad (8)$$

Letting $\alpha 4$ and $\beta 4$ be constants and S(Dr) be the relative delay quality degradation amount 27, S(Ds) can be estimated by $$S(Ds) = \min\{\alpha 4(Ds - \beta 4), 0\} \quad (9)$$

The delay quality degradation amount estimation unit 12 then causes the delay quality degradation amount calculation unit 12B to calculate the delay quality degradation amount 23B corresponding to the audio delay time 22A and video delay time 22B on the basis of the absolute delay quality degradation amount 26 calculated by the absolute delay quality degradation amount calculation unit 12C and the relative delay quality degradation amount 27 calculated by the delay quality degradation amount calculation unit 12D (step 216).

Figure 14:
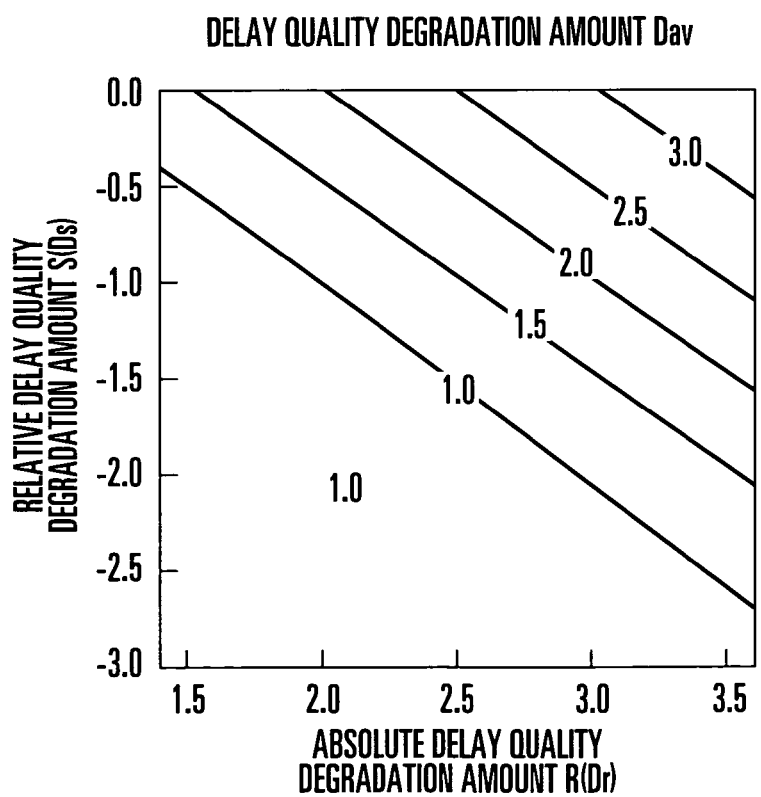
FIG. 14 is a graph showing an example of a characteristic of delay quality degradation amount estimation.

FIG. 14 shows an example of a characteristic of delay quality degradation amount estimation. As shown in FIG. 14, the delay quality degradation amount 23B tends to monotonically increase with an increase in the sum of an absolute delay quality degradation amount R(Dr) and a relative delay quality degradation amount S(Ds).

The delay quality degradation amount 23B can therefore be expressed by, for example, the sum of the absolute delay quality degradation amount R(Dr) and the relative delay quality degradation amount S(Ds). Letting R(Dr) be the absolute delay quality degradation amount 26, Dav be the delay quality degradation amount 23B, min(a, b) be a function of selecting a smaller one of values a and b, and max(a, b) be a function of selecting a larger one of the values a and b, Dav normalized to the MOS value range of 1 to 5 is obtained by $$Dav = \min[5, \max\{R(Dr) + S(Ds), 1\}] \quad (10)$$

The delay quality degradation amount calculation unit 12B then outputs the calculated delay quality degradation amount 23B to a video communication quality estimation unit 13 (step 217), and terminates the series of delay quality degradation amount estimation processing.

In this manner, this embodiment obtains an absolute delay quality degradation amount representing quality degradation due to the absolute delays of audio and video media and a relative delay quality degradation amount representing quality degradation due to the relative delays of the audio and video media from the audio delay time 22A and the video delay time 22B, and indirectly estimates the delay quality degradation amount 23B from the absolute delay quality degradation amount and the relative degradation quality degradation amount. This makes it possible to estimate the delay quality degradation amount 23B corresponding to the audio delay time 22A and video delay time 22B with a very simple estimation model, and hence to reduce the processing load and processing time required for the estimation of video communication quality.

In addition, in this embodiment, the absolute delay quality degradation amount calculation unit 12C estimates an absolute delay quality degradation amount corresponding to the delay time sum of an audio delay time and a video delay time on the basis of an absolute delay quality degradation characteristic that the absolute delay quality degradation amount monotonically increases with an increase in the delay time sum of the audio delay time and the video delay time. This makes it possible to accurately estimate, with simple processing, an absolute delay quality degradation amount in consideration of the human perception characteristic of perceiving a degradation in video communication quality owing to the absolute delay from the input to the output of each medium.

Furthermore, in this embodiment, the delay quality degradation amount calculation unit 12D estimates an absolute delay quality degradation amount corresponding to the delay time difference between an audio delay time and video delay time on the basis of a relative delay quality degradation characteristic that the relative delay quality degradation amount monotonically decreases with an increase in the delay time difference between the audio delay time and the video delay time. This makes it possible to accurately estimate, with simple processing, a relative delay quality degradation amount in consideration of the human perception characteristic of perceiving a degradation in video communication quality owing to the relative delay time offset i.e., step-out, between media.

[Third Embodiment]

Figure 15:
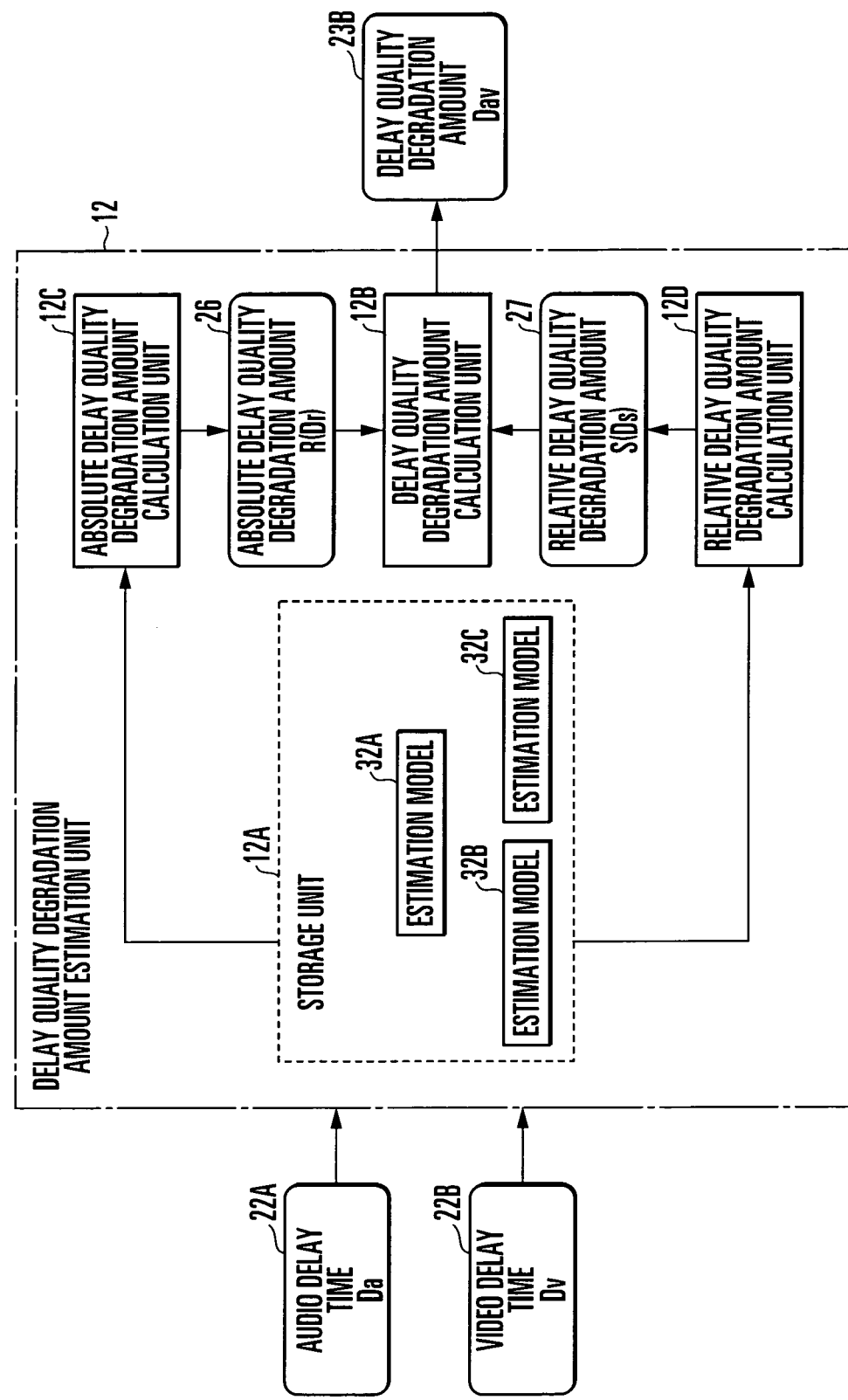
FIG. 15 is a block diagram showing the arrangement of the main part of a video communication quality estimation apparatus according to the third embodiment of the present invention.

A video communication quality estimation apparatus according to the third embodiment of the present invention will be described next with reference to FIG. 15. FIG. 15 is a block diagram showing the arrangement of the main part of the video communication quality estimation apparatus according to the third embodiment of the present invention. The same reference numerals as in FIG. 10 described above denote the same or similar parts in FIG. 15.

The second embodiment has exemplified the case in which the relative delay quality degradation amount 27 corresponding to the delay time difference between the audio delay time 22A and the video delay time 22B is obtained on the basis of one relative delay quality degradation amount estimation model 32B.

This embodiment exemplifies a case in which a relative delay quality degradation amount estimation model used for the estimation of a relative delay quality degradation amount 27 is selected on the basis of the relationship in magnitude between an audio delay time 22A and a video delay time 22B.

The arrangement of a video communication quality estimation apparatus 1 according to this embodiment differs from that according to the second embodiment (see FIG. 10) only in a storage unit 12A and delay quality degradation amount calculation unit 12D of a delay quality degradation amount estimation unit 12. Other arrangements are the same as those of the second embodiment, and a detailed description thereof will be omitted.

[Delay Quality Degradation Amount Estimation Unit]

As shown in FIG. 15, the delay quality degradation amount estimation unit 12 includes the storage unit 12A, a delay quality degradation amount calculation unit 12B, an absolute delay quality degradation amount calculation unit 12C, and the delay quality degradation amount calculation unit 12D as main functional means.

The storage unit 12A has a function of storing, in advance, an absolute delay quality degradation amount estimation model 32A representing the relationship between the delay time sum of the audio delay time 22A and the video delay time 22B and an absolute delay quality degradation amount 26 and a plurality of different relative delay quality degradation amount estimation models 32B and 32C corresponding to the relationship in magnitude between the audio delay time 22A and the video delay time 22B.

The absolute delay quality degradation amount calculation unit 12C has a function of calculating the absolute delay quality degradation amount 26 corresponding to the delay time sum of the audio delay time 22A and the video delay time 22B on the basis of the absolute delay quality degradation amount estimation model 32A in the storage unit 12A.

The delay quality degradation amount calculation unit 12D has a function of selecting a relative delay quality degradation amount estimation model corresponding to the relationship in magnitude between the audio delay time 22A and the video delay time 22B from the storage unit 12A and a function of calculating the relative delay quality degradation amount 27 corresponding to the delay time difference between the audio delay time 22A and the video delay time 22B on the basis of the selected relative delay quality degradation amount estimation model.

The delay quality degradation amount calculation unit 12B has a function of calculating the delay quality degradation amount 23B corresponding to the audio delay time 22A and video delay time 22B on the basis of the absolute delay quality degradation amount 26 calculated by the absolute delay quality degradation amount calculation unit 12C and the relative delay quality degradation amount 27 calculated by the delay quality degradation amount calculation unit 12D.

In video communication of bidirectionally exchanging audio and video media upon compositing them, when the audio and video media are exchanged between the communication terminals, the user perceives quality degradations of these media in accordance with the relative delay caused between the communication terminals, i.e., the step-out (playback timing offset) between the media. In this case, the user has a perception characteristic that the degree to which the user feels relative delay quality degradation changes in accordance with the relationship in magnitude between an audio delay time and a video delay time.

This embodiment selects a relative delay quality degradation amount estimation model in accordance with the relationship in magnitude between an audio delay time and a video delay time, and causes the delay quality degradation amount calculation unit 12D to estimate the relative delay quality degradation amount 27 on the basis of the selected relative delay quality degradation amount estimation model.

Of these functional units, the storage unit for various types of arithmetic processing data and programs comprises storage devices such as a memory and a hard disk. An arithmetic processing unit (computer) for performing various types of arithmetic processing comprises a CPU and its peripheral circuits. This unit implements various types of functional means by reading and executing programs (not shown) in the storage unit so as to make the above hardware and programs operate cooperatively. Note that the respective functional units can individually include storage units and arithmetic processing units or can share a storage unit and an arithmetic processing unit.

[Operation of Third Embodiment]

Figure 16:
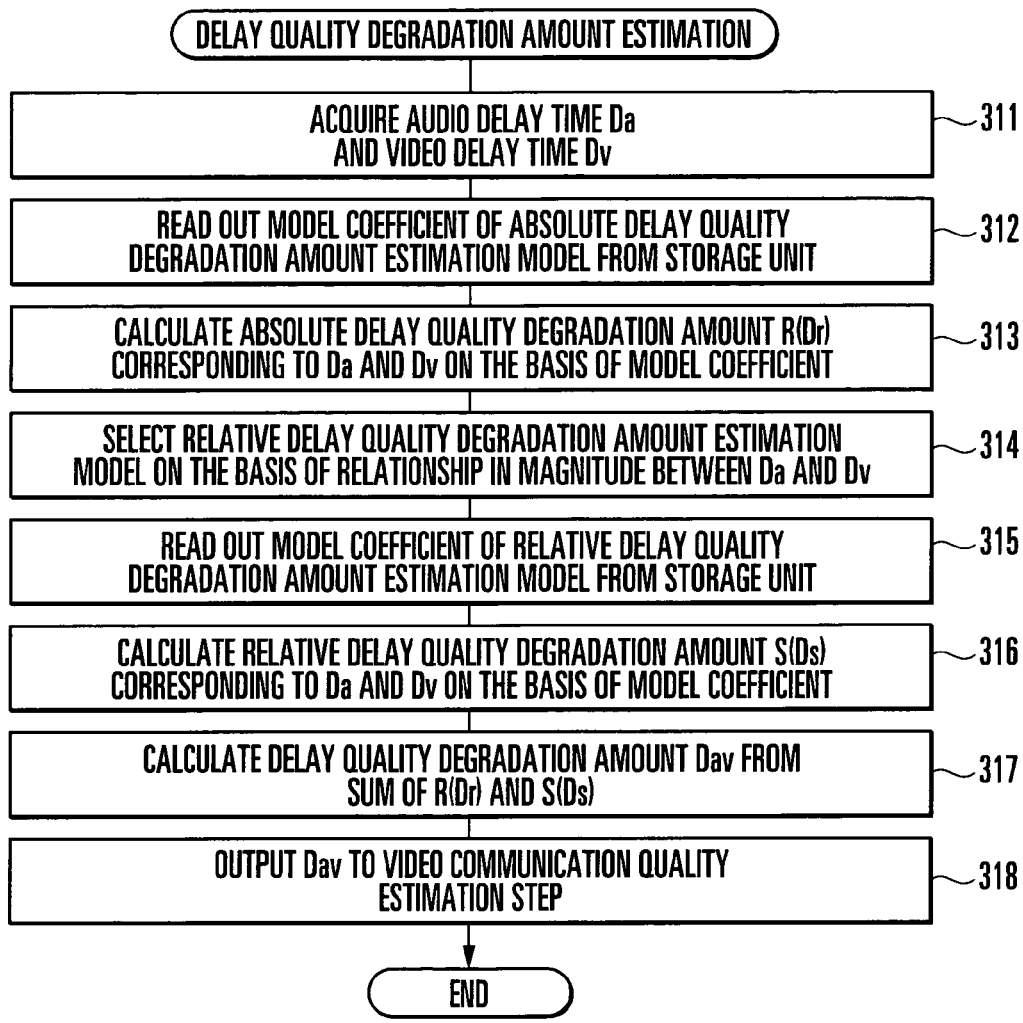
FIG. 16 is a flowchart showing delay quality degradation amount estimation processing by the video communication quality estimation apparatus according to the third embodiment of the present invention.

Of the operations performed by the video communication quality estimation apparatus according to the third embodiment of the present invention, the delay quality degradation amount estimation operation will be described in detail next with reference to FIG. 16. FIG. 16 is a flowchart showing delay quality degradation amount estimation processing by the video communication quality estimation apparatus according to the third embodiment of the present invention. The operation of the video communication quality estimation apparatus 1 according to this embodiment differs from that according to the second embodiment only in delay quality degradation amount estimation operation. Other processing operations are the same as those of the second embodiment, and a detailed description thereof will be omitted.

The delay quality degradation amount estimation unit 12 of the video communication quality estimation apparatus 1 executes the delay quality degradation amount processing in FIG. 16 in the delay quality degradation amount estimation step in step 110 in FIG. 2.

First of all, the delay quality degradation amount estimation unit 12 acquires the externally input audio delay time 22A and video delay time 22B from the delay quality degradation amount calculation unit 12B (step 311). The delay quality degradation amount estimation unit 12 reads out a model coefficient representing the absolute delay quality degradation amount estimation model 32A from the storage unit 12A (step 312), and calculates the absolute delay quality degradation amount 26 corresponding to the delay time sum of the audio delay time 22A and video delay time 22B on the basis of the absolute delay quality degradation amount estimation model 32A (step 313). Steps 311 to 313 are the same as steps 211 to 213 in FIG. 11, and a detailed description thereof will be omitted.

The delay quality degradation amount estimation unit 12 also causes the delay quality degradation amount calculation unit 12D to select a relative delay quality degradation amount estimation model corresponding to the relationship in magnitude between the audio delay time 22A and the video delay time 22B (step 314). The delay quality degradation amount estimation unit 12 then reads out a model coefficient representing the selected relative delay quality degradation amount estimation model from the storage unit 12A (step 315), and calculates the relative delay quality degradation amount 27 corresponding to the delay time difference between the audio delay time 22A and the video delay time 22B on the basis of this relative delay quality degradation amount estimation model (step 316).

Figure 17:
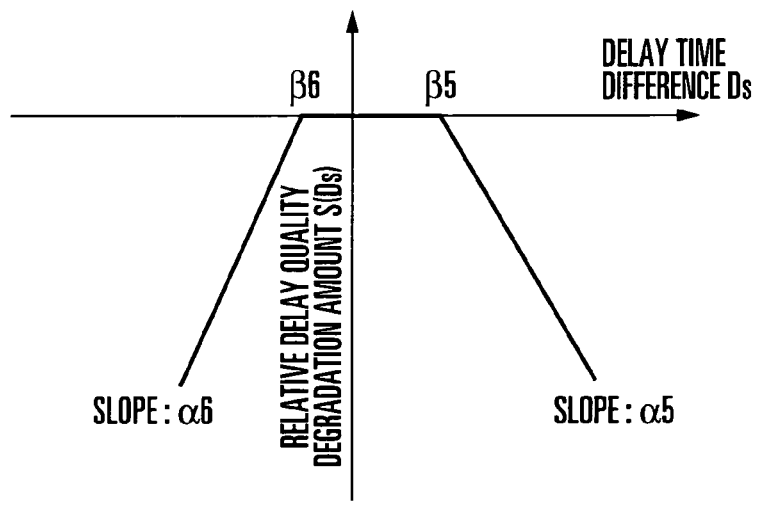
FIG. 17 is a graph showing an example of a characteristic of relative delay quality degradation amount estimation.

FIG. 17 shows an example of a characteristic of relative delay quality degradation amount estimation. In this embodiment, the storage unit 12A stores, in advance, as relative delay quality degradation characteristics perceived by a user, two relative delay quality degradation amount estimation models 32B and 32C corresponding to the relationship in magnitude between the audio delay time 22A and the video delay time 22B, which is information indicating whether the audio delay time 22A is longer or shorter than the video delay time 22B in this case, i.e., the sign of a delay time difference Ds. Of these models, the relative delay quality degradation amount estimation model 32B is used when the audio delay time 22A is equal to or more than the video delay time 22B, and the relative delay quality degradation amount estimation model 32C is used when the audio delay time 22A is shorter than the video delay time 22B.

As shown in FIG. 17, when the audio delay time 22A is equal to or more than the video delay time 22B, the relative delay quality degradation amount 27 tends to indicate 0 until the delay time difference Ds between an audio delay time Da and a video delay time Dv reaches a predetermined value and monotonically decrease with a further increase in the delay time difference Ds. When the audio delay time 22A is shorter than the video delay time 22B, the relative delay quality degradation amount 27 tends to indicate 0 until the delay time difference Ds between the audio delay time Da and the video delay time Dv reaches a predetermined value and monotonically decrease with a decrease in the delay time difference Ds.

When, therefore, the audio delay time 22A is equal to or more than the video delay time 22B, the relative delay quality degradation amount 27 can be expressed by a linear function expression using the delay time difference between the audio delay time 22A and the video delay time 22B as a variable. Letting Ds (=Da−Dv) be the delay time difference between the audio delay time 22A and the video delay time 22B, α5 and β5 be constants, and S(Ds) be the relative delay quality degradation amount 27, S(Ds) can be estimated by $$S(Ds)=\min\{\alpha 5(Ds-\beta 5), 0\} \text{ when } Ds \geq 0 \qquad (11)$$

Likewise, when the audio delay time 22A is shorter than the video delay time 22B, the relative delay quality degradation amount 27 can be expressed by a linear function expression using the delay time difference between the audio delay time 22A and the video delay time 22B as a variable. Letting Ds (=Da−Dv) be the delay time difference between the audio delay time 22A and the video delay time 22B, α6 and β6 be constants, and S(Ds) be the relative delay quality degradation amount 27, S(Ds) can be estimated by $$S(Ds)=\min\{\alpha 6(Ds-\beta 6), 0\} \text{ when } Ds < 0 \qquad (12)$$

The delay quality degradation amount estimation unit 12 then causes the delay quality degradation amount calculation unit 12B to calculate a delay quality degradation amount 23B corresponding to the audio delay time 22A and video delay time 22B on the basis of the absolute delay quality degradation amount 26 calculated by the absolute delay quality degradation amount calculation unit 12C and the relative delay quality degradation amount 27 calculated by the delay quality degradation amount calculation unit 12D (step 317). Step 317 is the same as step 216 in FIG. 11, and a detailed description thereof will be omitted.

The delay quality degradation amount calculation unit 12B then outputs the calculated delay quality degradation amount 23B to the video communication quality estimation unit 13 (step 319), and terminates the series of delay quality degradation amount estimation processing.

In this manner, in this embodiment, the storage unit 12A stores, in advance, the plurality of relative delay quality degradation amount estimation models 32B and 32C corresponding to the relationship in magnitude between the audio delay time 22A and the video delay time 22B, and the delay quality degradation amount calculation unit 12D selects a relative delay quality degradation amount estimation model corresponding to the relationship in magnitude between the audio delay time 22A and the video delay time 22B and calculates the relative delay quality degradation amount 27 corresponding to the delay time difference between the audio delay time 22A and the video delay time 22B on the basis of the selected relative delay quality degradation amount estimation model. This makes it possible to accurately estimate, with simple processing, a relative delay quality degradation amount in consideration of the human perception characteristic that the degree to which the user feels relative delay quality degradation changes in accordance with the relationship in magnitude between an audio delay time and a video delay time.

In general, according to a human perception characteristic, a user feels video communication quality degradation more when an audio medium is played back with a delay from a video medium than when an audio medium is played back preceding a video medium. Using this embodiment, therefore, makes it possible to estimate a relative delay quality degradation amount in consideration of such a perception characteristic and hence to estimate video communication quality with high accuracy.

[Fourth Embodiment]

Figure 18:
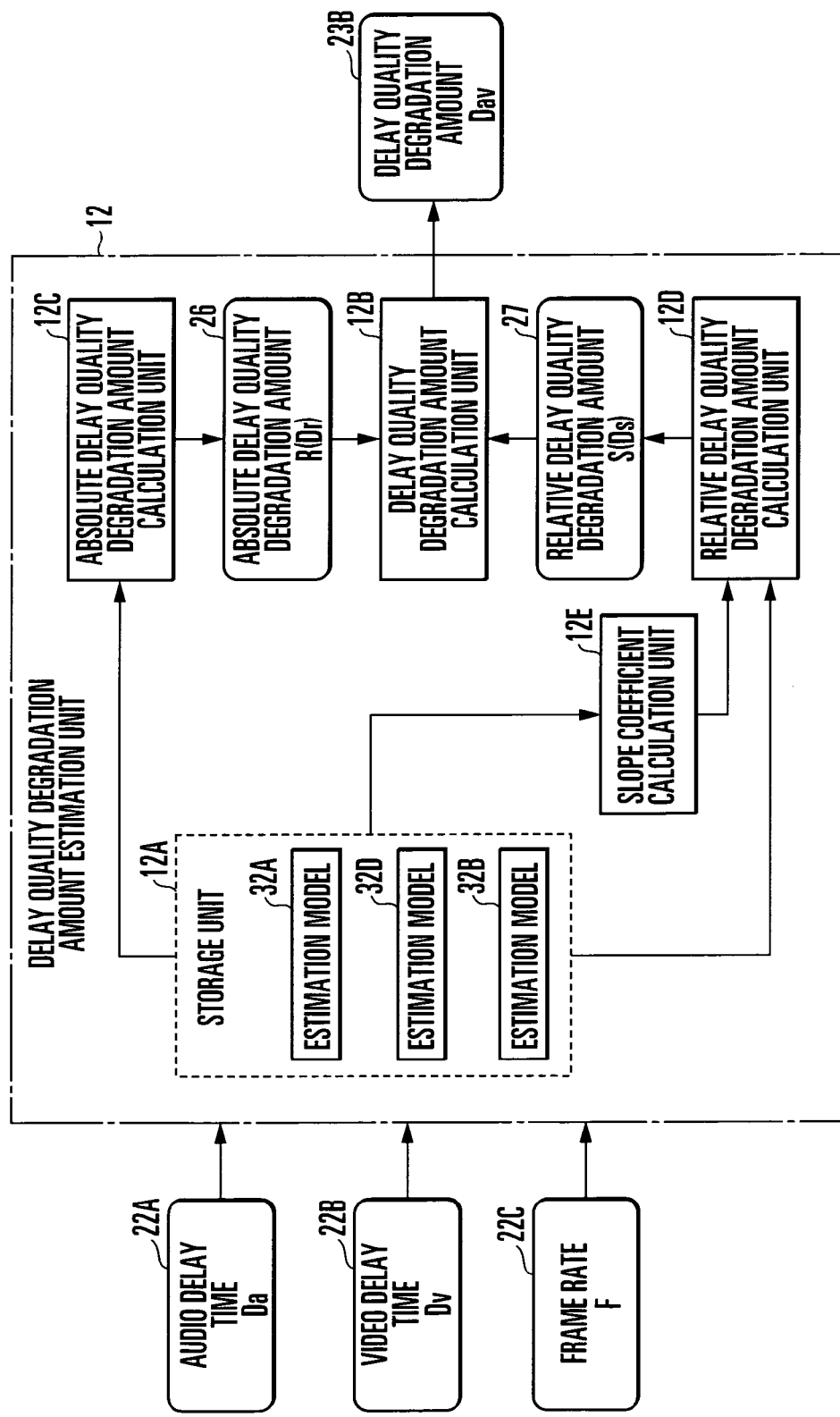
FIG. 18 is a block diagram showing the arrangement of the main part of a video communication quality estimation apparatus according to the fourth embodiment of the present invention.

A video communication quality estimation apparatus according to the fourth embodiment of the present invention will be described with reference to FIG. 18. FIG. 18 is a block diagram showing the arrangement of the main part of the video communication quality estimation apparatus according to the fourth embodiment of the present invention. The same reference numerals as in FIG. 10 described above denote the same or similar parts in FIG. 18.

The second embodiment has exemplified the case in which the relative delay quality degradation amount 27 corresponding to the audio delay time 22A and video delay time 22B is obtained on the basis of the relative delay quality degradation amount estimation model 32B.

This embodiment exemplifies a case in which a frame rate 22C is used in addition to an audio delay time 22A and a video delay time 22B, and a relative delay quality degradation amount 27 corresponding to the audio delay time 22A, video delay time 22B, and frame rate 22C is obtained. Note that a frame rate is the transfer rate of frames constituting a video medium, and is expressed by the number of frames to be transmitted per unit time.

The arrangement of a video communication quality estimation apparatus 1 according to this embodiment differs from that according to the second embodiment (see FIG. 10) only in a storage unit 12A and delay quality degradation amount calculation unit 12D of a delay quality degradation amount estimation unit 12. A slope coefficient calculation unit 12E is newly added to the arrangement of this embodiment. Other embodiments are the same as those of the second embodiment, and a detailed description thereof will be omitted.

[Delay Quality Degradation Amount Estimation Unit]

As shown in FIG. 18, the delay quality degradation amount estimation unit 12 includes the storage unit 12A, a delay quality degradation amount calculation unit 12B, an absolute delay quality degradation amount calculation unit 12C, the delay quality degradation amount calculation unit 12D, and the slope coefficient calculation unit 12E as main functional means.

The storage unit 12A has a function of storing, in advance, an absolute delay quality degradation amount estimation model 32A representing the relationship between the delay time sum of the audio delay time 22A and the video delay time 22B and an absolute delay quality degradation amount 26, a relative delay quality degradation amount estimation model 32B representing the relationship between the delay time difference between the audio delay time 22A and the video delay time 22B and the relative delay quality degradation amount 27, and a slope coefficient estimation model 32D representing the relationship between the frame rate 22C and a slope coefficient representing the slope of the relative delay quality degradation amount estimation model 32B.

The absolute delay quality degradation amount calculation unit 12C has a function of calculating the absolute delay quality degradation amount 26 corresponding to the delay time sum of the audio delay time 22A and the video delay time 22B on the basis of the absolute delay quality degradation amount estimation model 32A in the storage unit 12A.

The slope coefficient calculation unit 12E has a function of calculating a slope coefficient indicating the slope of the relative delay quality degradation amount estimation model 32B on the basis of the slope coefficient estimation model 32D in the storage unit 12A.

The delay quality degradation amount calculation unit 12D has a function of specifying the slope of the relative delay quality degradation amount estimation model 32B in the storage unit 12A on the basis of the slope coefficient calculated by the slope coefficient calculation unit 12E, and a function of calculating the relative delay quality degradation amount 27 corresponding to the delay time difference between the audio delay time 22A and the video delay time 22B on the basis of the delay quality degradation amount estimation model 32 whose slope is specified.

The delay quality degradation amount calculation unit 12B has a function of calculating a delay quality degradation amount 23B corresponding to the audio delay time 22A and video delay time 22B on the basis of the absolute delay quality degradation amount 26 calculated by the absolute delay quality degradation amount calculation unit 12C and the relative delay quality degradation amount 27 calculated by the delay quality degradation amount calculation unit 12D.

The degree of a relative delay quality degradation amount is influenced by the frame rate of a video medium. If, for example, the frame rate is low, even a relative offset between audio and video media is not perceived as a large quality degradation. As the frame rate increases, however, the quality degradation becomes more noticeable. There are many systems which cannot achieve a frame rate of 30 [frames/sec] like a recent system which provides videophone services using cellular phones. It is therefore a very important challenge to obtain comprehensive multi-modal quality in consideration of even changes in frame rate.

In this embodiment, the delay quality degradation amount calculation unit 12D uses, as a linear function, the relative delay quality degradation amount estimation model 32B, and the slope coefficient calculation unit 12E calculates the slope coefficient of a linear function corresponding to a frame rate on the basis of a characteristic that the slope coefficient of this linear function increases in a logarithmic function manner with an increase in frame rate, i.e., the slope coefficient estimation model 32D. This makes it possible to estimate the relative delay quality degradation amount of the video communication in consideration of even changes in frame rate.

Of these functional units, the storage unit for various types of arithmetic processing data and programs comprises storage devices such as a memory and a hard disk. An arithmetic processing unit (computer) for performing various types of arithmetic processing comprises a CPU and its peripheral circuits. This unit implements various types of functional means by reading and executing programs (not shown) in the storage unit so as to make the above hardware and programs operate cooperatively. Note that the respective functional units can individually include storage units and arithmetic processing units or can share a storage unit and an arithmetic processing unit.

[Operation of Fourth Embodiment]

Figure 19:
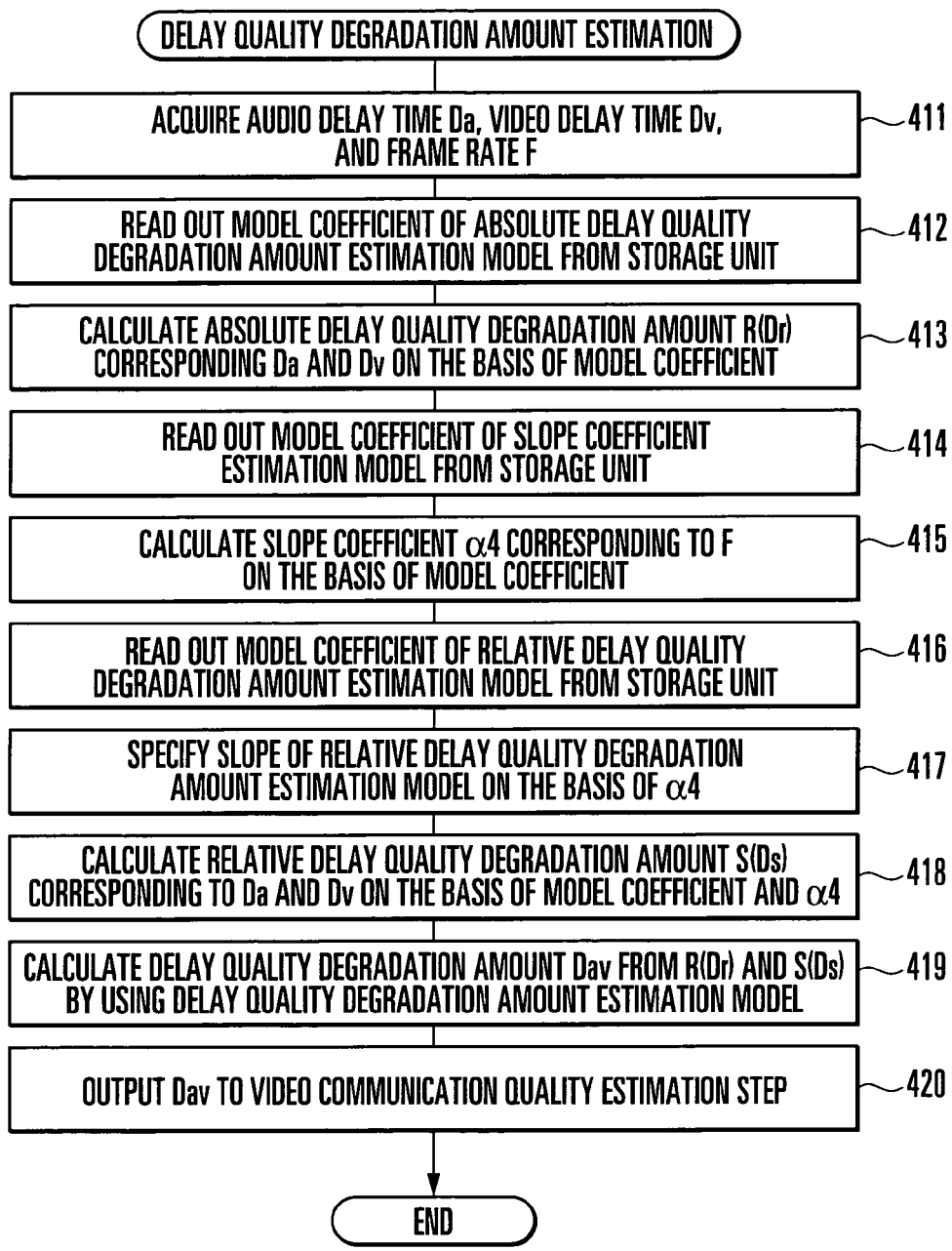
FIG. 19 is a flowchart showing delay quality degradation amount estimation processing by the video communication quality estimation apparatus according to the fourth embodiment of the present invention.

Of the operations performed by the video communication quality estimation apparatus according to the fourth embodiment of the present invention, the delay quality degradation amount estimation operation will be described in detail next with reference to FIG. 19. FIG. 19 is a flowchart showing delay quality degradation amount estimation processing by the video communication quality estimation apparatus according to the fourth embodiment of the present invention. The operation of the video communication quality estimation apparatus 1 according to this embodiment differs from that according to the second embodiment only in delay quality degradation amount estimation operation. Other processing operations are the same as those of the second embodiment, and a detailed description thereof will be omitted.

The delay quality degradation amount estimation unit 12 of the video communication quality estimation apparatus 1 executes the delay quality degradation amount estimation processing in FIG. 19 in the delay quality degradation amount estimation step in step 110 in FIG. 2.

First of all, the delay quality degradation amount estimation unit 12 causes the delay quality degradation amount calculation unit 12B to acquire the externally input audio delay time 22A, video delay time 22B, and frame rate 22C (step 411). The delay quality degradation amount estimation unit 12 then causes the absolute delay quality degradation amount calculation unit 12C to read out a model coefficient representing the absolute delay quality degradation amount estimation model 32A from the storage unit 12A (step 412) and calculate the absolute delay quality degradation amount 26 corresponding to the delay time sum of the audio delay time 22A and the video delay time 22B on the basis of the absolute delay quality degradation amount estimation model 32A (step 413). Steps 411 to 413 are the same as steps 211 to 213 in FIG. 11 described above, and a detailed description thereof will be omitted.

The delay quality degradation amount estimation unit 12 also causes the slope coefficient calculation unit 12E to read out a model coefficient representing the slope coefficient estimation model 32D from the storage unit 12A (step 414) and calculate a slope coefficient indicating the slope of the relative delay quality degradation amount estimation model 32B on the basis of the slope coefficient estimation model 32D (step 415).

FIG. 20 shows an example of a characteristic of relative delay quality degradation amount estimation. As shown in FIG. 20, the relative delay quality degradation amount 27 tends to indicate 0 until a delay time difference Ds between an audio delay time Da and a video delay time Dv reaches a predetermined value and monotonically decrease with a further increase in the delay time difference Ds.

A slope α4 of the relative delay quality degradation amount estimation model 32B tends to become gentle with a decrease in the frame rate 22C.

FIG. 21 shows an example of a characteristic of slope coefficient estimation. As shown in FIG. 21, the slope α4 of the relative delay quality degradation amount estimation model 32B tends to monotonically decrease with an increase in the logarithmic value of the frame rate 22C.

The slope coefficient α4 can therefore be expressed by a linear function expression using the logarithmic value of the frame rate 22C as a variable.

Letting F be the frame rate 22C, log(F) be the logarithmic value of the frame rate, α41 and β41 be constants, and α4 be the slope coefficient of the relative delay quality degradation amount estimation model 32B, α4 is obtained by $$\alpha 4 = \alpha 41 \cdot \log(F) + \alpha 42 \qquad (13)$$

The delay quality degradation amount estimation unit 12 then causes the delay quality degradation amount calculation unit 12D to read out a model coefficient representing the relative delay quality degradation amount estimation model 32B from the storage unit 12A (step 416) and specify the slope of the relative delay quality degradation amount estimation model 32B by letting the model coefficient contain the slope coefficient calculated by the slope coefficient calculation unit 12E (step 417).

The delay quality degradation amount estimation unit 12 then calculates the relative delay quality degradation amount 27 corresponding to the delay time difference between the audio delay time 22A and the video delay time 22B on the basis of the obtained relative delay quality degradation amount estimation model 32B (step 418).

Subsequently, the delay quality degradation amount estimation unit 12 causes the delay quality degradation amount calculation unit 12B to calculate the delay quality degradation amount 23B corresponding to the audio delay time 22A and video delay time 22B on the basis of the absolute delay quality degradation amount 26 calculated by the absolute delay quality degradation amount calculation unit 12C and the relative delay quality degradation amount 27 calculated by the delay quality degradation amount calculation unit 12D (step 419). Steps 418 and 419 are the same as steps 215 and 216 in FIG. 11 described above, and a detailed description thereof will be omitted.

The delay quality degradation amount calculation unit 12B then outputs the calculated delay quality degradation amount 23B to the video communication quality estimation unit 13 (step 420), and terminates the series of delay quality degradation amount estimation processing.

In this manner, this embodiment uses the relative delay quality degradation amount estimation model 32B as a linear function and causes the slope coefficient calculation unit 12E to estimate the slope coefficient of a linear function corresponding to a frame rate on the basis of a slope coefficient estimation model in which the slope coefficient of the linear function increases in a logarithmic function manner with an increase in frame rate. The embodiment then calculates the relative delay quality degradation amount 27 corresponding to the delay time difference between the audio delay time 22A and the video delay time 22B on the basis of the relative delay quality degradation amount estimation model 32B specified by this slope coefficient. This makes it possible to accurately estimate, with simple processing, a relative delay quality degradation amount in consideration of the human perception characteristic that the degree to which the user feels relative delay quality degradation in accordance with the frame rate of a video medium.

[Fifth Embodiment]

Figure 22:
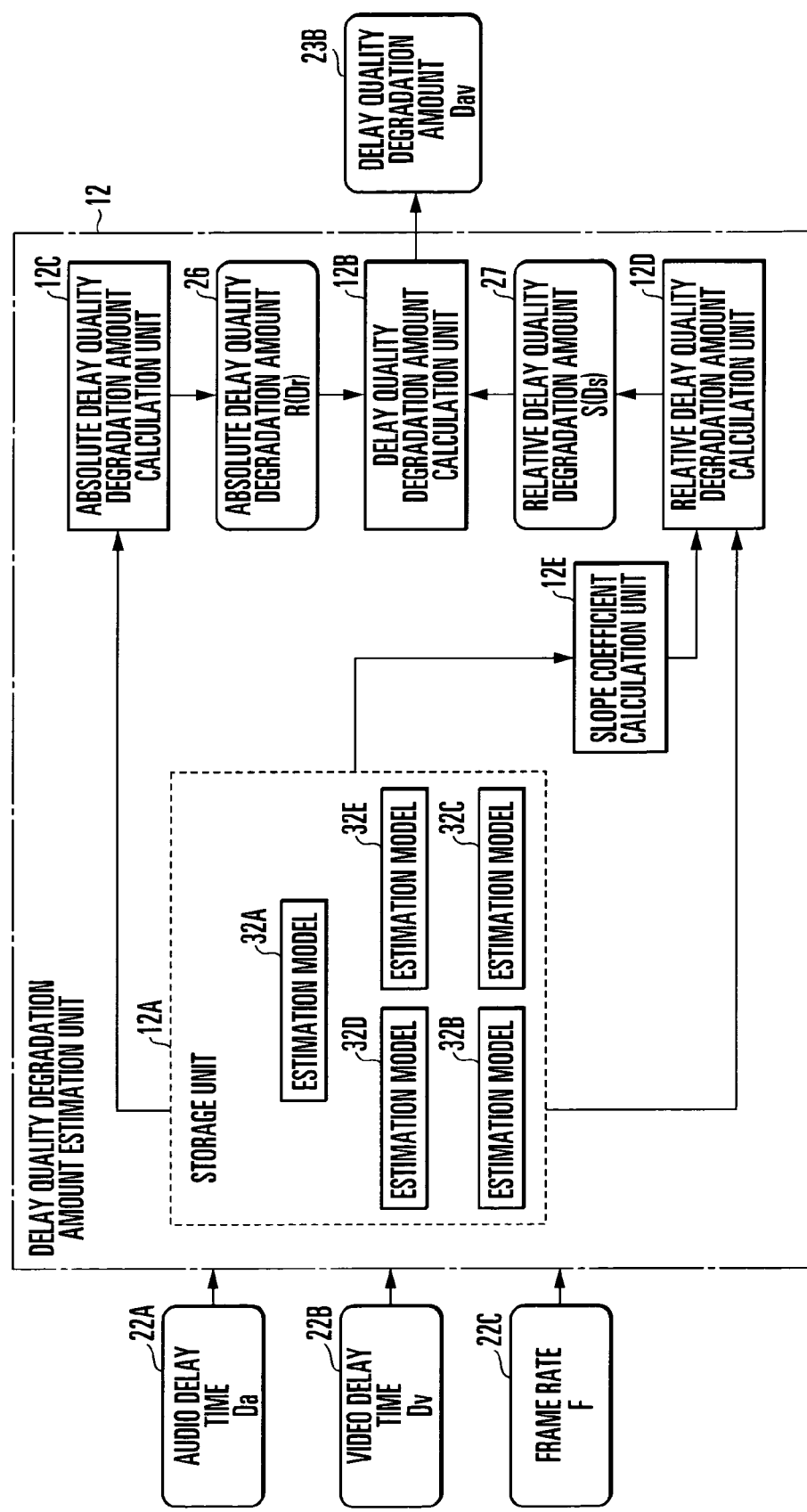
FIG. 22 is a block diagram showing the arrangement of the main part of a video communication quality estimation apparatus according to the fifth embodiment of the present invention.

A video communication quality estimation apparatus according to the fifth embodiment of the present invention will be described next with reference to FIG. 22. FIG. 22 is a block diagram showing the arrangement of the main part of the video communication quality estimation apparatus according to the fifth embodiment of the present invention. The same reference numerals as in FIG. 18 described above denote the same or similar parts in FIG. 22.

The fourth embodiment has exemplified the case in which the slope of one relative delay quality degradation amount estimation model 32B based on a linear function is specified by the slope coefficient calculated by the frame rate 22C, and the relative delay quality degradation amount 27 corresponding to the delay time difference between the audio delay time 22A and the video delay time 22B is obtained on the basis of the specified relative delay quality degradation amount estimation model 32B.

This embodiment exemplifies a case in which a relative delay quality degradation amount estimation model used for the estimation of a relative delay quality degradation amount 27 is selected on the basis of the relationship in magnitude between an audio delay time 22A and a video delay time 22B.

The arrangement of the video communication quality estimation apparatus 1 according to this embodiment differs from that according to the second embodiment (see FIG. 10) only in a storage unit 12A and delay quality degradation amount calculation unit 12D of a delay quality degradation amount estimation unit 12. Other arrangements are the same as those of the fourth embodiment, and a detailed description thereof will be omitted.

[Delay Quality Degradation Amount Estimation Unit]

As shown in FIG. 22, the delay quality degradation amount estimation unit 12 includes the storage unit 12A, a delay quality degradation amount calculation unit 12B, an absolute delay quality degradation amount calculation unit 12C, the delay quality degradation amount calculation unit 12D, and a slope coefficient calculation unit 12E as main functional means.

The storage unit 12A has a function of storing, in advance, an absolute delay quality degradation amount estimation model 32A representing the relationship between the delay time sum of the audio delay time 22A and the video delay time 22B and an absolute delay quality degradation amount 26, a plurality of different relative delay quality degradation amount estimation models 32B and 32C corresponding to the relationship in magnitude between the audio delay time 22A and the video delay time 22B, and a plurality of different slope coefficient estimation models 32D and 32E corresponding to the relationship in magnitude between the audio delay time 22A and the video delay time 22B.

The absolute delay quality degradation amount calculation unit 12C has a function of calculating the absolute delay quality degradation amount 26 corresponding to the delay time sum of the audio delay time 22A and the video delay time 22B on the basis of the absolute delay quality degradation amount estimation model 32A in the storage unit 12A.

The slope coefficient calculation unit 12E has a function of selecting a slope coefficient estimation model corresponding to the relationship in magnitude between the audio delay time 22A and the video delay time 22B from the storage unit 12A and a function of calculating a slope coefficient indicating the slope of the relative delay quality degradation amount estimation model 32B on the basis of the selected slope coefficient estimation model 32D.

The delay quality degradation amount calculation unit 12D has a function of selecting a relative delay quality degradation amount estimation model corresponding to the relationship in magnitude between the audio delay time 22A and the video delay time 22B and a function of calculating the relative delay quality degradation amount 27 corresponding to the delay time difference between the audio delay time 22A and the video delay time 22B on the basis of the selected relative delay quality degradation amount estimation model.

The delay quality degradation amount calculation unit 12B has a function of calculating the delay quality degradation amount 23B corresponding to the audio delay time 22A and video delay time 22B on the basis of the absolute delay quality degradation amount 26 calculated by the absolute delay quality degradation amount calculation unit 12C and the relative delay quality degradation amount 27 calculated by the delay quality degradation amount calculation unit 12D.

In video communication of bidirectionally exchanging audio and video media upon compositing them, when the audio and video media are exchanged between the communication terminals, the user perceives quality degradations of these media in accordance with the relative delay caused between the communication terminals, i.e., the step-out (playback timing offset) between the media. In this case, the user has a perception characteristic that the degree to which he/she feels relative delay quality degradation changes in accordance with the relationship in magnitude between an audio delay time and a video delay time.

This embodiment selects a slope coefficient estimation model and relative delay quality degradation amount estimation model in accordance with the relationship in magnitude between an audio delay time and a video delay time, and causes the slope coefficient calculation unit 12E to calculate a slope coefficient corresponding to the frame rate of a video medium on the basis of the selected slope coefficient estimation model. The embodiment then specifies the slope of the selected relative delay quality degradation amount estimation model from the slope coefficient; and causes the delay quality degradation amount calculation unit 12D to estimate the relative delay quality degradation amount 27 on the basis of the relative delay quality degradation amount estimation model.

Of these functional units, the storage unit for various types of arithmetic processing data and programs comprises storage devices such as a memory and a hard disk. An arithmetic processing unit (computer) for performing various types of arithmetic processing comprises a CPU and its peripheral circuits. This unit implements various types of functional means by reading and executing programs (not shown) in the storage unit so as to make the above hardware and programs operate cooperatively. Note that the respective functional units can individually include storage units and arithmetic processing units or can share a storage unit and an arithmetic processing unit.

[Operation of Fifth Embodiment]

Figure 23:
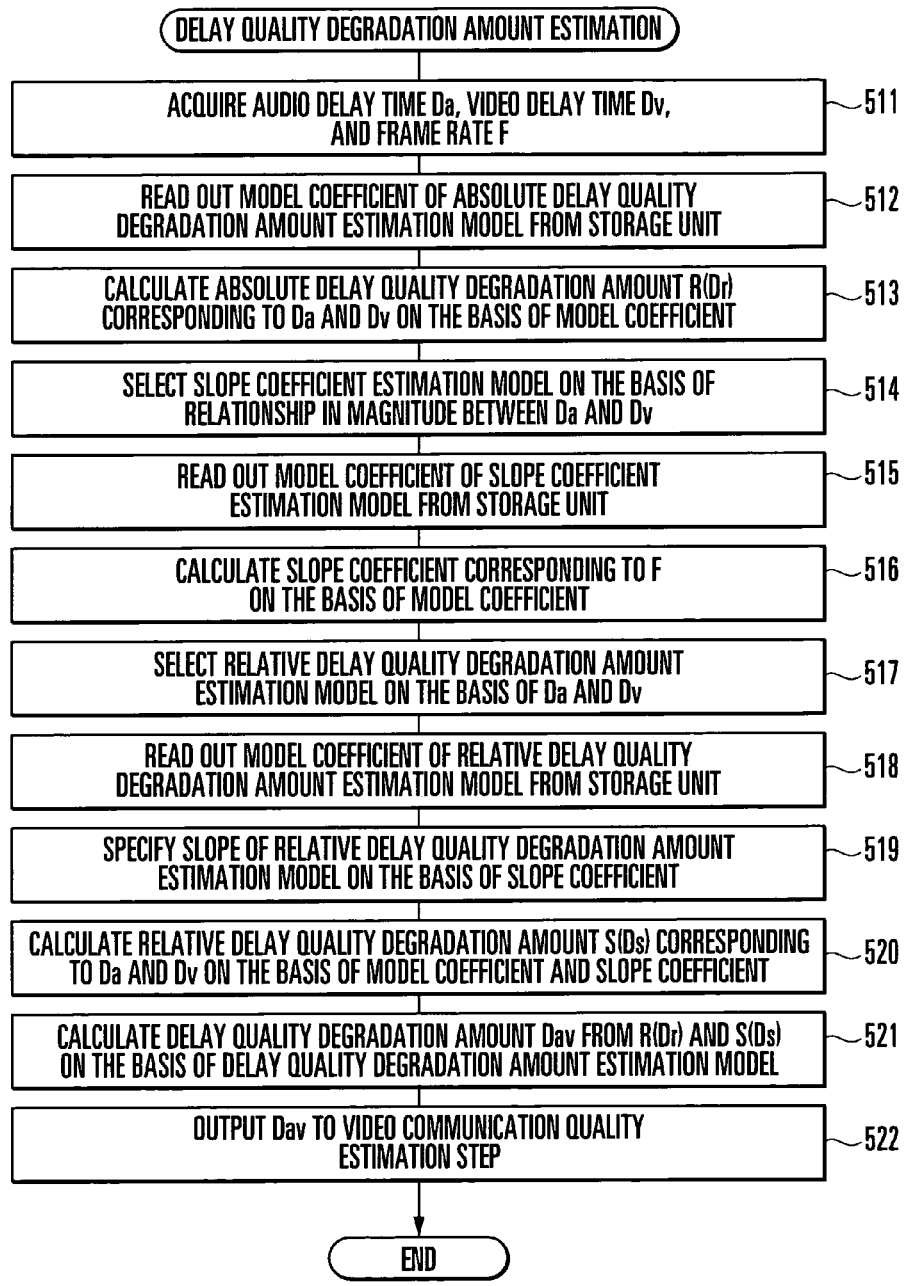
FIG. 23 is a flowchart showing delay quality degradation amount estimation processing by the video communication quality estimation apparatus according to the fifth embodiment of the present invention.

Of the operations performed by the video communication quality estimation apparatus according to the fifth embodiment of the present invention, the delay quality degradation amount estimation operation will be described in detail next with reference to FIG. 23. FIG. 23 is a flowchart showing delay quality degradation amount estimation processing by the video communication quality estimation apparatus according to the fifth embodiment of the present invention. The operations of a video communication quality estimation apparatus 1 according to this embodiment differ from those according to the fourth embodiment in only delay quality degradation amount estimation operation. Other processing operations are the same as those of the fourth embodiment, and a detailed description thereof will be omitted.

The delay quality degradation amount estimation unit 12 of the video communication quality estimation apparatus 1 executes the delay quality degradation amount estimation processing in FIG. 23 in the delay quality degradation amount estimation step in step 110 in FIG. 2.

First of all, the delay quality degradation amount estimation unit 12 causes the delay quality degradation amount calculation unit 12B to acquire the audio delay time 22A, the video delay time 22B, and a frame rate 22C which are externally input (step S511). The delay quality degradation amount estimation unit 12 then causes the absolute delay quality degradation amount calculation unit 12C to read out a model coefficient representing the absolute delay quality degradation amount estimation model 32A from the storage unit 12A (step 512) and calculate the absolute delay quality degradation amount 26 corresponding to the delay time sum of the audio delay time 22A and the video delay time 22B on the basis of the absolute delay quality degradation amount estimation model 32A (step 513). Steps 511 to 513 are the same as steps 211 to 213 in FIG. 11, and a detailed description thereof will be omitted.

The delay quality degradation amount estimation unit 12 also causes the slope coefficient calculation unit 12E to select a slope coefficient estimation model corresponding to the relationship in magnitude between the audio delay time 22A and the video delay time 22B (step 514). The delay quality degradation amount estimation unit 12 then reads out a model coefficient representing the slope coefficient estimation model 32D from the storage unit 12A (step 515), and calculates a slope coefficient indicating the slope of the relative delay quality degradation amount estimation model 32B on the basis of the slope coefficient estimation model 32D (step 516).

Figure 24:
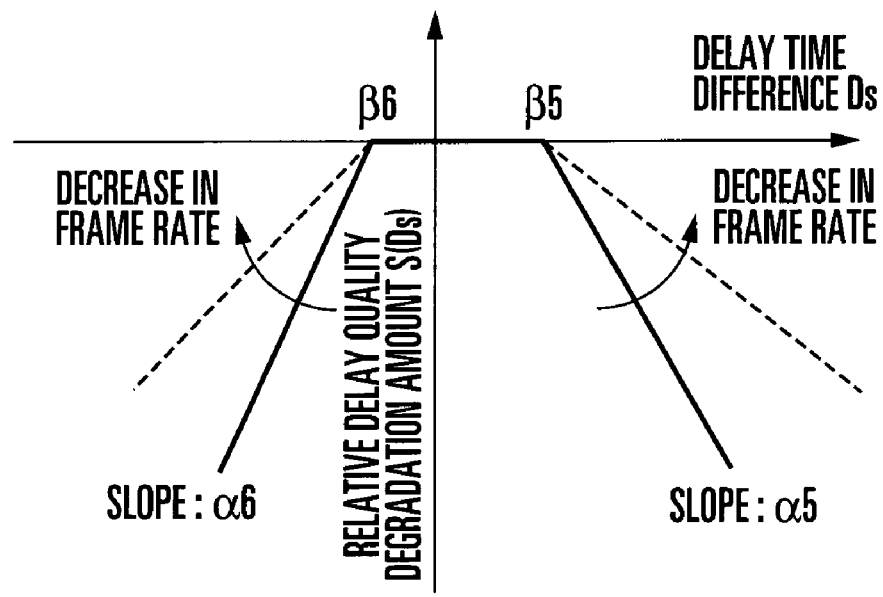
FIG. 24 is a graph showing an example of a characteristic of relative delay quality degradation amount estimation.

FIG. 24 shows an example of a characteristic of relative delay quality degradation amount estimation. In this embodiment, the storage unit 12A stores, in advance, as relative delay quality degradation characteristics perceived by a user, two relative delay quality degradation amount estimation models 32B and 32C corresponding to the relationship in magnitude between the audio delay time 22A and the video delay time 22B, which is information indicating whether the audio delay time 22A is longer or shorter than the video delay time 22B in this case, i.e., the sign of a delay time difference Ds. Of these models, the relative delay quality degradation amount estimation model 32B is used when the audio delay time 22A is equal to or more than the video delay time 22B, and the relative delay quality degradation amount estimation model 32C is used when the audio delay time 22A is shorter than the video delay time 22B.

As shown in FIG. 24, when the audio delay time 22A is equal to or more than the video delay time 22B, the relative delay quality degradation amount 27 tends to indicate 0 until the delay time difference Ds between an audio delay time Da and a video delay time Dv reaches a predetermined value and monotonically decrease with a further increase in the delay time difference Ds. When the audio delay time 22A is shorter than the video delay time 22B, the relative delay quality degradation amount 27 tends to indicate 0 until the delay time difference Ds between the audio delay time Da and the video delay time Dv reaches a predetermined value and monotonically decrease with a further decrease in the delay time difference Ds.

The slopes $\alpha 5$ and $\alpha 6$ of the relative delay quality degradation amount estimation models 32B and 32C tend to become moderate with a decrease in the frame rate 22C.

Figure 25:
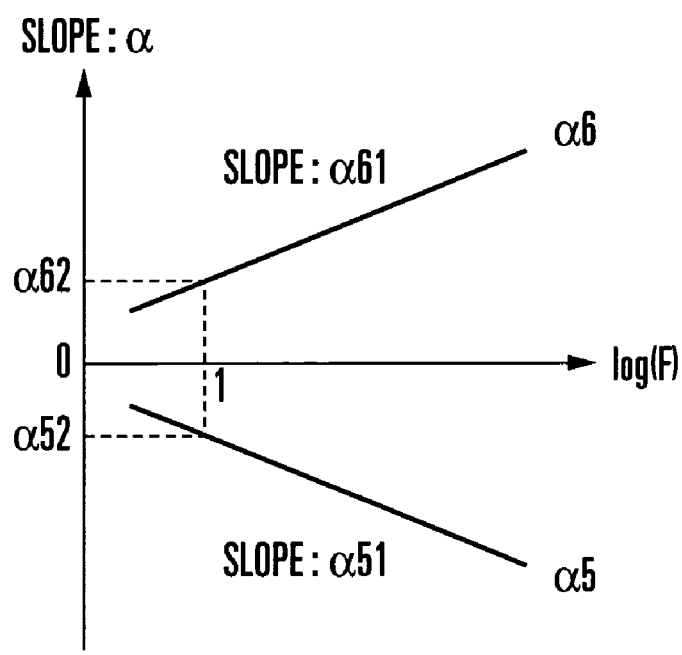
FIG. 25 is a graph showing an example of a characteristic of slope coefficient estimation.

FIG. 25 shows an example of a characteristic of slope coefficient estimation. As shown in FIG. 25, the slope $\alpha 5$ of the relative delay quality degradation amount estimation model 32B tends to monotonically decrease with an increase in the logarithmic value of the frame rate 22C. The slope $\alpha 6$ of the relative delay quality degradation amount estimation model 32C tends to monotonically increase with an increase in the logarithmic value of the frame rate 22C.

The slope coefficients $\alpha 5$ and $\alpha 6$ can therefore be expressed by a linear function expression using the logarithmic value of the frame rate 22C as a variable. Letting F be the frame rate 22C, log(F) be the logarithmic value of the frame rate, $\alpha 51$ and $\beta 51$ be constants, and $\alpha 5$ be the slope coefficient of the relative delay quality degradation amount estimation model 32B, $\alpha 5$ is obtained by $$\alpha 5 = \alpha 51 \cdot \log(F) + \alpha 52 \text{ when } Ds \geq 0 \quad (14)$$

Letting F be the frame rate 22C, log(F) be the logarithmic value of the frame rate, $\alpha 61$ and $\beta 61$ be constants, and $\alpha 6$ be the slope coefficient of the relative delay quality degradation amount estimation model 32C, $\alpha 6$ is obtained by $$\alpha 6 = \alpha 61 \cdot \log(F) + \alpha 62 \text{ when } Ds < 0 \quad (15)$$

The delay quality degradation amount estimation unit 12 then causes the delay quality degradation amount calculation unit 12D to read out a relative delay quality degradation amount estimation model corresponding to the relationship in magnitude between the audio delay time 22A and the video delay time 22B (step 517). The delay quality degradation amount estimation unit 12 then reads out a model coefficient representing the selected relative delay quality degradation amount estimation model from the storage unit 12A (step 518) and specifies the slope of the relative delay quality degradation amount estimation model by letting the model coefficient contain the slope coefficient $\alpha 5$ or $\alpha 6$ calculated by the slope coefficient calculation unit 12E (step 519).

The delay quality degradation amount estimation unit 12 calculates the relative delay quality degradation amount 27 corresponding to the delay time difference between the audio delay time 22A and the video delay time 22B on the basis of the obtained relative delay quality degradation amount estimation model (step 520).

Subsequently, the delay quality degradation amount estimation unit 12 causes the delay quality degradation amount calculation unit 12B to calculate the delay quality degradation amount 23B corresponding to the audio delay time 22A and video delay time 22B on the basis of the absolute delay quality degradation amount 26 calculated by the absolute delay quality degradation amount calculation unit 12C and the relative delay quality degradation amount 27 calculated by the delay quality degradation amount calculation unit 12D (step 521). Steps 517 and 518 are the same as steps 314 and 315 in FIG. 16 described above, step 519 is the same as step 417 in FIG. 19 described above, and steps 520 and 521 are the same as steps 215 and 216 in FIG. 11 described above. A detailed description of these steps will be omitted.

The delay quality degradation amount calculation unit 12B then outputs the calculated delay quality degradation amount 23B to the video communication quality estimation unit 13 (step 522), and terminates the series of delay quality degradation amount estimation processing.

In this manner, this embodiment selects a slope coefficient estimation model and a relative delay quality degradation amount estimation model in accordance with the relationship in magnitude between an audio delay time and a video delay time, and causes the slope coefficient calculation unit 12E to calculate a slope coefficient corresponding to the frame rate of a video medium on the basis of the selected slope coefficient estimation model. The embodiment then specifies the slope of the selected relative delay quality degradation amount estimation model in accordance with the slope coefficient, and causes the delay quality degradation amount calculation unit 12D to estimate the relative delay quality degradation amount 27 on the basis of this relative delay quality degradation amount estimation model. This makes it possible to accurately estimate, with simple processing, a relative delay quality degradation amount in consideration of both the human perception characteristic that the degree to which the user feels relative delay quality degradation in accordance with the frame rate of a video medium and the human perception characteristic that the degree to which the user feels relative delay quality degradation changes in accordance with the relationship in magnitude between an audio delay time and a video delay time.

[Sixth Embodiment]

Figure 26:
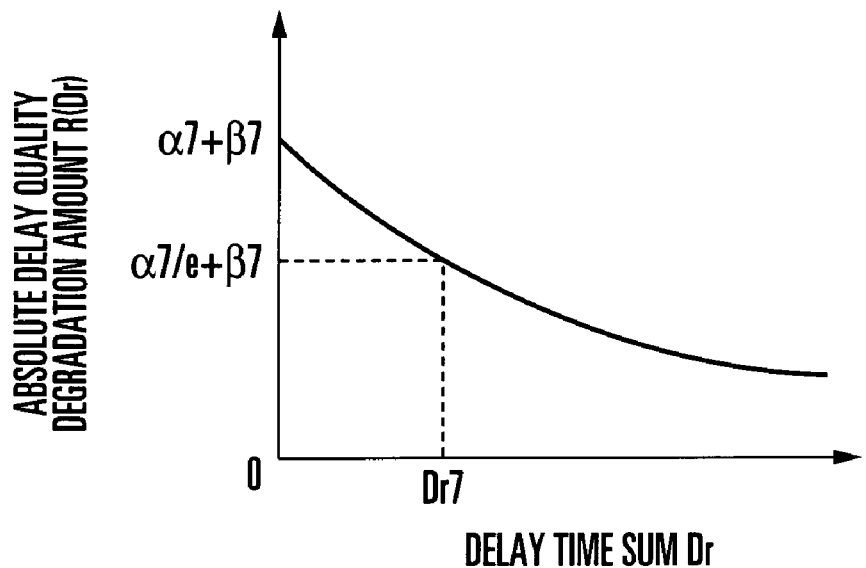
FIG. 26 is a graph showing an example of a characteristic of an absolute delay quality degradation amount estimation model used in a video communication quality estimation apparatus according to the sixth embodiment of the present invention.

A video communication quality estimation apparatus according to the sixth embodiment of the present invention will be described next with reference to FIG. 26. FIG. 26 shows an example of a characteristic of an absolute delay quality degradation amount estimation model used by the video communication quality estimation apparatus according to the sixth embodiment of the present invention.

The second embodiment has exemplified the case in which when the absolute delay quality degradation amount calculation unit 12C of the delay quality degradation amount estimation unit 12 calculates the absolute delay quality degradation amount 26 corresponding to the delay time sum of the audio delay time 22A and the video delay time 22B, the absolute delay quality degradation amount estimation model 32A is modeled with a linear function.

This embodiment exemplifies a case in which an absolute delay quality degradation amount estimation model 32A is modeled with a nonlinear function. Note that other arrangements and operations are the same as those of the second embodiment, and a detailed description thereof will be omitted.

As shown in FIG. 26, the absolute delay quality degradation amount estimation model 32A varies to some extent depending on an environment in which a video communication as an evaluation target is performed. In some cases, therefore, modeling the absolute delay quality degradation amount estimation model 32A with a nonlinear function rather than a linear function leads to an improvement in estimation accuracy.

Nonlinear functions include various function types. For example, when an exponential function is to be used, letting Dr be the delay time sum of an audio delay time Da and a video delay time Dv, $\alpha 7$, $\beta 7$, and Dr7 be constants, and R(Dr) be the absolute delay quality degradation amount 26, R(Dr) can be estimated by $$R(Dr) = \alpha 7 \cdot \exp\left(-\frac{Dr}{Dr7}\right) + \beta 7 \tag{16}$$

In this manner, this embodiment models the absolute delay quality degradation amount estimation model 32A with a nonlinear function, and hence can improve the estimation accuracy. Using an exponential function makes it possible to model the absolute delay quality degradation amount estimation model 32A with a simple function expression. Note that this embodiment can be applied to the third to fifth embodiments as well as the second embodiment, and similar functions and effects can be obtained. In the third and fifth embodiments, in particular, a plurality of relative delay quality degradation amount estimation models are used for the estimation of the relative delay quality degradation amount 27 on the basis of the relationship in magnitude between the audio delay time 22A and the video delay time 22B, and these relative delay quality degradation amount estimation models can be modeled with nonlinear functions.

[Seventh Embodiment]

Figure 27:
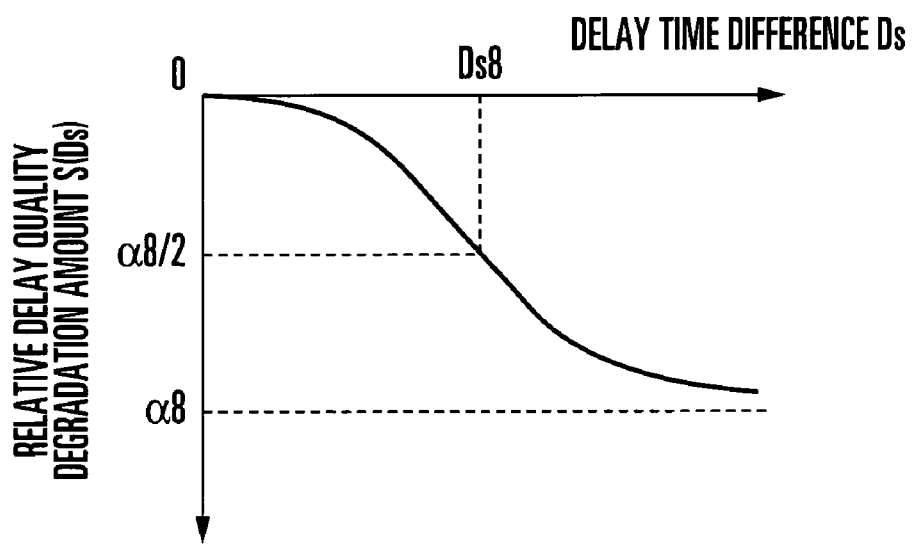
FIG. 27 is a graph showing an example of a characteristic of a relative delay quality degradation amount estimation model used in a video communication quality estimation apparatus according to the seventh embodiment of the present invention.

A video communication quality estimation apparatus according to the seventh embodiment of the present invention will be described next with reference to FIG. 27. FIG. 27 shows an example of a characteristic of a relative delay quality degradation amount estimation model used by the video communication quality estimation apparatus according to the seventh embodiment of the present invention.

The second embodiment has exemplified the case in which when calculating the relative delay quality degradation amount 27 corresponding to the delay time difference between the audio delay time 22A and the video delay time 22B, the relative delay quality degradation amount calculation unit 12D of the delay quality degradation amount estimation unit 12 models the relative delay quality degradation amount estimation model 32B with a linear function.

This embodiment exemplifies a case in which the relative delay quality degradation amount estimation model 32B is modeled with a nonlinear function. Other arrangements and operations are the same as those of the second embodiment, and a detailed description thereof will be omitted.

As shown in FIG. 27, a relative delay quality degradation amount estimation model 32B varies to some extent depending on an environment in which a video communication as an evaluation target is performed. In some cases, therefore, modeling an absolute delay quality degradation amount estimation model 32A with a nonlinear function rather than a linear function leads to an improvement in estimation accuracy.

Nonlinear functions include various function types. For example, when a logistic function is to be used, letting Ds be the delay time difference between an audio delay time Da and a video delay time Dv, $\alpha 8$, $\beta 8$, and Ds8 be constants, and S(Ds) be the relative delay quality degradation amount 27, S(Ds) can be estimated by $$S(Ds) = \alpha 8 \cdot \left(1 - \frac{1}{1 + (Ds/Ds8)^{\beta 8}}\right) \tag{17}$$

In this manner, this embodiment models the relative delay quality degradation amount estimation model 32B with a nonlinear function, and hence can improve the estimation accuracy. Using a logistic function makes it possible to model the relative delay quality degradation amount estimation model 32B with a simple function expression. Note that this embodiment can be applied to the third to fifth embodiments as well as the second embodiment, and similar functions and effects can be obtained.

When the relative delay quality degradation amount estimation model 32B is to be modeled with a nonlinear function, as in the same manner indicated by equations (11) and (12) described in the third embodiment, it suffices to store, in the storage unit 12A in advance, the two relative delay quality degradation amount estimation models 32B corresponding to the relationship in magnitude between an audio delay time 22A and a video delay time 22B and select the relative delay quality degradation amount estimation model 32B used for the estimation of the relative delay quality degradation amount 27 on the basis of the relationship in magnitude between the audio delay time 22A and the video delay time 22B.

Figure 28:
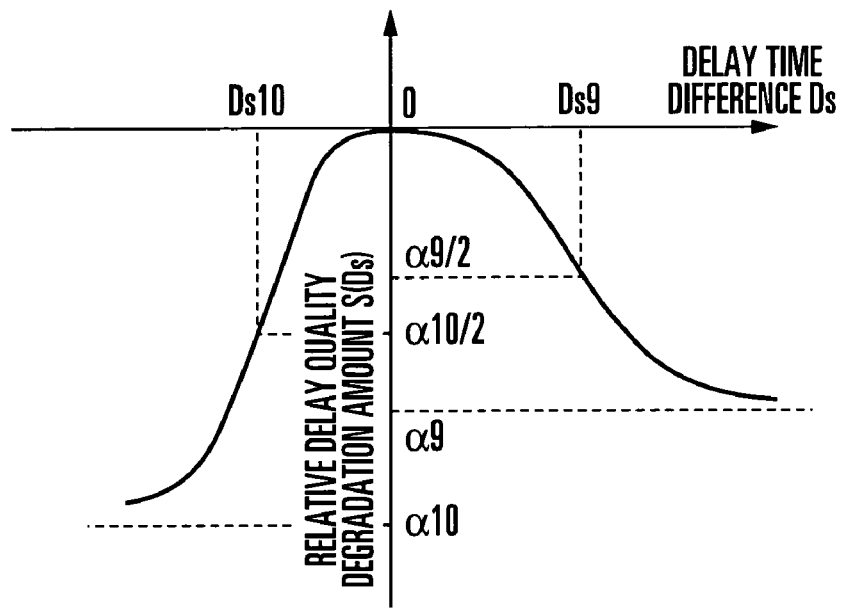
FIG. 28 is a graph showing another example of a characteristic of the relative delay quality degradation amount estimation model used in the video communication quality estimation apparatus according to the seventh embodiment of the present invention.

FIG. 28 shows another example of a characteristic of relative delay quality degradation amount estimation. According to this example of a characteristic, when the audio delay time 22A is equal to or more than the video delay time 22B, a relative delay quality degradation amount 27 tends to gradually decrease from 0 until the delay time difference Ds between the audio delay time Da and the video delay time Dv reaches a predetermined value and monotonically decrease with a further increase in the delay time difference Ds. In addition, when the audio delay time 22A is shorter than the video delay time 22B, the relative delay quality degradation amount 27 tends to gradually decrease from 0 until the delay time difference Ds between the audio delay time Da and the video delay time Dv reaches a predetermined value and monotonically decrease with a further decrease in the delay time difference Ds.

When, therefore, the audio delay time 22A is equal to or more than the video delay time 22B, the relative delay quality degradation amount 27 can be expressed by a logistic function expression using the delay time difference between the audio delay time 22A and the video delay time 22B as a variable. Letting Ds (=Da−Dv) be the delay time difference between the audio delay time 22A and the video delay time 22B, α9, β9, and Ds9 be constants, and S(Ds) be the relative delay quality degradation amount 27, S(Ds) can be estimated by $$S(Ds) = \alpha 9 \cdot \left(1 - \frac{1}{1 + (Ds/Ds9)^{\beta 9}}\right) \text{ when } Ds \geq 0 \quad (18)$$

Likewise, when the audio delay time 22A is shorter than the video delay time 22B, the relative delay quality degradation amount 27 can be expressed by a logistic function expression using the delay time difference between the audio delay time 22A and the video delay time 22B as a variable. Letting Ds (=Da−Dv) be the delay time difference between the audio delay time 22A and the video delay time 22B, α10, β10, and Ds10 be constants, and S(Ds) be the relative delay quality degradation amount 27, S(Ds) can be estimated by $$S(Ds) = \alpha 10 \cdot \left(1 - \frac{1}{1 + (|Ds|/Ds10)^{\beta 10}}\right) \text{ when } Ds \geq 0 \quad (19)$$

Note that FIGS. 27 and 28 each show the tendency that the relative delay quality degradation amount 27 converges to coefficients α8 to α10 at an end portion of the example of a characteristic. However, since the delay quality degradation amount 23B is normalized to the MOS value range of 1 to 5 as indicated by equation (10) given above, the portion corresponding to the above tendency at the end portion of the example of a characteristic is not used for the actual estimation of the relative delay quality degradation amount 27.

Figure 29:
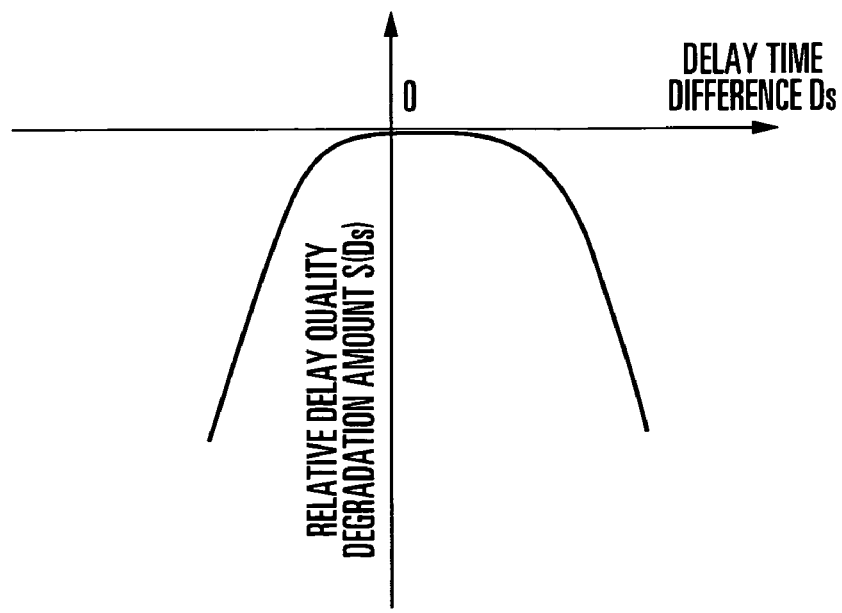
FIG. 29 is a graph showing still another example of a characteristic of the relative delay quality degradation amount estimation model used in the video communication quality estimation apparatus according to the seventh embodiment of the present invention.

In addition, when the relative delay quality degradation amount estimation model 32B is to be modeled with a non-linear function, a function other than equations (17) to (19) using logistic functions may be used. FIG. 29 shows another example of a characteristic of relative delay quality degradation amount estimation. With regard to such an example of a characteristic, equations (17) to (19) can be expressed by exponential functions.

With regard to equation (17), for example, letting Ds be the delay time difference between the audio delay time Da and the video delay time Dv, α11, β11, and Ds11 be constants, and S(Ds) be the relative delay quality degradation amount 27, S(Ds) can be estimated by $$S(Ds) = \alpha 11 \cdot Ds^{\beta 11} \quad (20)$$

In addition, with regard to equation (18) when the audio delay time 22A is equal to or more than the video delay time 22B, letting Ds be the delay time difference between the audio delay time Da and the video delay time Dv, α12, β12, and Ds12 be constants, and S(Ds) be the relative delay quality degradation amount 27, S(Ds) can be estimated by $$S(Ds) = \alpha 12 \cdot Ds^{\beta 12} \text{ when } Ds \geq 0 \quad (21)$$

Likewise, with regard to equation (19) when the audio delay time 22A is shorter than the video delay time 22B, letting Ds be the delay time difference between the audio delay time Da and the video delay time Dv, α13, β13, and Ds13 be constants, and S(Ds) be the relative delay quality degradation amount 27, S(Ds) can be estimated by $$S(Ds) = \alpha 13 \cdot |Ds|^{\beta 13} \text{ when } Ds < 0 \quad (22)$$

[Eighth Embodiment]

A method of deriving constant values of the respective numerical expressions used in the respective embodiments will be described next.

First of all, a communication environment including communication terminals and an encoding scheme, which uses video communication, and the like to be used and an assumed usage scene such as a business meeting or a free conversation are set, and an evaluation experimental system which can control video quality including audio quality and a video frame rate and audio and video delay times is constructed. These qualities can be changed by a network emulator apparatus which can control network quality parameters such as a packet loss rate, and a packet delay time/fluctuation time. The video frame rate can be changed by a set parameter in a video communication application.

Video communication is then performed between communication terminals in accordance with the above assumed scene while audio quality, video quality including a video frame rate, and audio and video delay times are changed in various states, and video communication quality is evaluated by a five-grade quality scale in comprehensive consideration of all quality factors.

A quality is expressed by a MOS (Mean Opinion Score) value. A MOS value is obtained by assigning scores of 5 to 1 to "excellent", "good", "fair", "poor", and "bad" of the five-grade quality scale, respectively, and averaging the scores voted by persons who evaluate. In a subject quality evaluation experiment, an audio quality evaluation value and a video quality evaluation value are obtained in addition to a video communication quality in the same manner as described above. Note that the details of a subjective evaluation experiment method is described in ITU-T recommendation P.911. In addition, as an audio quality estimation value and a video quality estimation value, values derived by using an objective quality estimation technique such as ITU-T recommendation P.862 or ITU-T recommendation J.144 described above can be used.

After various types of quality evaluation values are acquired in this manner, processing for deriving coefficients for various types of mathematical expressions is performed. This processing will be described below by taking the fifth embodiment as an example.

First of all, constants α1, β1, γ1, and δ1 are derived by approximating the relationship between the audio quality evaluation value MOSa, the video quality evaluation value MOSv, and the multi-modal quality value MOSmm with the function form of equation (1) on the basis of evaluation results obtained under a condition free from the influence of time delays.

Constants α3, β3, β5, α51, α52, β6, α61, and α62 are then derived by approximating quality degradation amounts obtained when the audio and video delay times are changed under the condition in which audio quality and video quality are at the maximum levels with the function forms of equations (6) to (8), (11), (12), (14), and (15), respectively.

Subsequently, constants α2, β2, γ2, and δ2 are derived by approximating the relationship between the multi-modal quality value MOSmm, the delay quality degradation amount Dav, and the video communication quality value MOSall with the function form of equation (4) by using all the evaluation results.

Although these constants are values which change depending on in which communication environment video communication is used, to which scene video communication is used, which conversation is made, and the like, constants can be uniquely determined by performing a subjective quality evaluation experiment once upon determining a scene for which a service is assumed to be used. This embodiment has been described by taking the fifth embodiment as an example, and can be applied to other embodiments in the same manner.

[Extension of Embodiments]

Each embodiment has been described on the premise that there is symmetry between an audio quality evaluation value and a video quality evaluation value in each communication terminal which performs video communication by using a multi-modal service, and the two communication terminals obtain equal audio quality evaluation values and equal video quality evaluation values. If there is no symmetry between an audio quality evaluation value and a video quality evaluation value, and the two communication terminals cannot obtain equal audio quality evaluation values and equal video quality evaluation values, for example, the multi-modal quality estimation unit 11 can calculate the multi-modal quality value 23A obtained by combining multi-modal qualities in the two communication terminals.

Alternatively, the multi-modal quality estimation unit 11 can estimate the individual multi-modal quality value 23A for each communication terminal, and the video communication quality estimation unit 13 can estimate the video communication quality value 24 on the basis of the multi-modal quality value 23A and the delay quality degradation amount 23B.

The second to fifth embodiments have exemplified the case in which when calculating the delay quality degradation amount Dav corresponding to the audio delay time 22A and video delay time 22B, the delay quality degradation amount calculation unit 12B calculates Dav from the sum of the absolute delay quality degradation amount R(Dr) calculated by the absolute delay quality degradation amount calculation unit 12C and the relative delay quality degradation amount S(Ds) calculated by the delay quality degradation amount calculation unit 12D. However, the present invention is not limited to this. For example, letting $\alpha14$, $\beta14$, $\gamma14$, and $\delta14$ be constants, Dav can be estimated from equation (23) given below and can be estimated in consideration of the interaction between R(Dr) and S(Ds).

$$Dav = \alpha14 \cdot R(Dr) + \beta14 \cdot S(Ds) + \gamma14 \cdot R(Dr) \cdot S(Ds) + \delta14 \quad (23)$$

In addition, each embodiment has exemplified the case in which one or two estimation models are used as estimation models for calculating various types of quality values and slope coefficients. However, the present invention is not limited to this.

These estimation models vary to some extent depending on an environment in which a video communication as an evaluation target is performed. Parameters that influence a video communication environment include, for example, a communication type parameter indicating the communication type of a video communication service, a playback performance parameter indicating the playback performance of a terminal which plays back a video medium, and a playback environment parameter indicating the playback environment of a terminal which plays back a video medium.

As a specific example of a communication type parameter, there is "task" indicating the type of communication performed in a video communication service as an evaluation target.

Specific examples of playback performance parameters include not only "encoding scheme", "video format", and "key frame" associated with encoding of a video medium but also "monitor size", "monitor resolution", and the like associated with a medium playback function in a terminal.

Specific examples of playback environment parameters include "indoor illuminance" at the time of playback of a medium in a terminal.

It suffices therefore to store, in the storage unit, the function form of an estimation model and its coefficient for each combination of such parameters and to select the function form of an estimation model and its coefficient on the basis of externally input parameters at the time of estimation. This makes it possible to flexibly cope with different video communication environments and estimate a video communication quality value with high accuracy.

Each embodiment has exemplified the case in which a calculated quality value represented by a MOS value is normalized to fall within the MOS value range of 1 to 5. If, however, calculated quality values fall within the range of 1 to 5, the normalization processing can be omitted.

In addition, each embodiment has exemplified the case in which functions such as min( ) and max( ) are used as specific examples of normalization. However, normalization can be performed by using other functions.

Furthermore, each embodiment has exemplified the case in which estimation models are modeled with linear and non-linear functions. However, these estimation models are not limited to functions, and models other than functions can be used. For example, it suffices to use a database in a table form in which the input/output relationship of an estimation model is defined. It also suffices to use a black box model whose input/output characteristic is specified alone, e.g., a neural network or a case base.

The invention claimed is:

1. A video communication quality estimation apparatus which estimates quality associated with video communication of bidirectionally exchanging an audio medium and a video medium upon compositing the audio medium and the video medium between communication terminals connected via a network, characterized by comprising:

a multi-modal quality estimation unit which estimates a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a video medium quality evaluation value as a quality evaluation value of the video medium;

a delay quality degradation amount estimation unit which estimates a delay quality degradation amount caused by an audio medium delay and a video medium delay on the basis of an audio delay time as a delay time from input of the audio medium to output of the audio medium between communication terminals and a video delay time as a delay time from input of the video medium to output of the video medium between the communication terminals; and a video communication quality estimation unit which estimates quality of the video communication on the basis of the multi-modal quality value estimated by said multi-modal quality estimation unit and the delay quality degradation amount estimated by said delay quality degradation amount estimation unit, characterized in that said delay quality degradation amount estimation unit includes:

a storage unit which stores, in advance, a delay quality degradation amount estimation model representing a relationship between an audio delay time, a video delay time, and a delay quality degradation amount, and a delay quality degradation amount calculation unit which calculates a delay quality degradation amount corresponding to the audio delay time and the video delay time on the basis of the delay quality degradation amount estimation model, characterized in that the delay quality degradation amount estimation unit has a convex characteristic that when the audio delay time is constant, the delay quality degradation amount monotonically increases and reaches a predetermined maximum value with an increase in the video delay time, and monotonically decreases with a further increase in the video delay time, and a convex characteristic that when the video delay time is constant, the delay quality degradation amount monotonically increases and reaches a predetermined maximum value with an increase in the audio delay time, and monotonically decreases with a further increase in the audio delay time.

2. A video communication quality estimation apparatus which estimates quality associated with video communication of bidirectionally exchanging an audio medium and a video medium upon compositing the audio medium and the video medium between communication terminals connected via a network, characterized by comprising:

a multi-modal quality estimation unit which estimates a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a video medium quality evaluation value as a quality evaluation value of the video medium;

a delay quality degradation mount estimation unit which estimates a delay quality degradation amount caused by an audio medium delay and a video medium delay on the basis of an audio delay time as a delay time from input of the audio medium to output of the audio medium between communication terminals and a video delay time as a delay time from input of the video medium to output of the video medium between the communication terminals; and a video communication quality estimation unit which estimates quality of the video communication on the basis of the multi-modal quality value estimated by said multi-modal quality estimation unit and the delay quality degradation amount estimated by said delay quality degradation amount estimation unit, characterized in that said delay quality degradation amount estimation unit includes:

an absolute delay quality degradation amount calculation unit which calculates an absolute delay quality degradation amount originating from an absolute delay of the audio medium and an absolute delay of the video medium on the basis of the audio delay time and the video delay time, a relative delay quality degradation amount calculation unit which calculates a relative delay quality degradation amount originating from a relative delay between the audio medium and the video medium on the basis of the audio delay time and the video delay time, and a delay quality degradation amount calculation unit which calculates the delay quality degradation amount on the basis of the absolute delay quality degradation amount and the relative delay quality degradation amount, characterized in that said delay quality degradation amount estimation unit includes a storage unit which stores, in advance, an absolute delay quality degradation amount estimation model representing a characteristic that an absolute delay quality degradation amount monotonically increases with an increase in a delay time sum of an audio delay time and a video delay time, and said delay quality degradation amount estimation unit calculates an absolute delay quality degradation amount corresponding to a delay time sum of the audio delay time and the video delay time on the basis of the absolute delay quality degradation amount estimation model.

3. A video communication quality estimation apparatus which estimates quality associated with video communication of bidirectionally exchanging an audio medium and a video medium upon compositing the audio medium and the video medium between communication terminals connected via a network, characterized by comprising:

a multi-modal quality estimation unit which estimates a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a video medium quality evaluation value as a quality evaluation value of the video medium;

a delay quality degradation amount estimation unit which estimates a delay quality degradation amount caused by an audio medium delay and a video medium delay on the basis of an audio delay time as a delay time from input of the audio medium to output of the audio medium between communication terminals and a video delay time as a delay time from input of the video medium to output of the video medium between the communication terminals; and a video communication quality estimation unit which estimates quality of the video communication on the basis of the multi-modal quality value estimated by said multi-modal quality estimation unit and the delay quality degradation amount estimated by said delay quality degradation amount estimation unit, characterized in that said delay quality degradation amount estimation unit includes:

an absolute delay quality degradation amount calculation unit which calculates an absolute delay quality degradation amount originating from an absolute delay of the audio medium and an absolute delay of the video medium on the basis of the audio delay time and the video delay time, a relative delay quality degradation amount calculation unit which calculates a relative delay quality degradation amount originating from a relative delay between the audio medium and the video medium on the basis of the audio delay time and the video delay time; and a delay quality degradation amount calculation unit which calculates the delay quality degradation amount on the basis of the absolute delay quality degradation amount and the relative delay quality degradation amount, characterized in that said delay quality degradation amount estimation unit includes a storage unit which stores, in advance, a relative delay quality degradation amount estimation model representing a characteristic that a relative delay quality degradation amount monotonically increases with an increase in a delay time difference between an audio delay time and a video delay time, and said relative delay quality degradation amount estimation unit derives a relative delay quality degradation amount corresponding to a delay time difference between the audio delay time and the video delay time on the basis of the relative delay quality degradation amount estimation model, and outputs the relative delay quality degradation amount, characterized in that a storage unit stores a plurality of relative delay quality degradation amount estimation models corresponding to a relationship in magnitude between an audio delay time and a video delay time, and said relative delay quality degradation amount estimation unit selects a relative delay quality degradation amount estimation model corresponding to a relationship in magnitude between the audio delay time and the video delay time from said storage unit, and calculates a relative delay quality degradation amount corresponding to a delay time difference between the audio delay time and the video delay time on the basis of the selected relative delay quality degradation amount estimation model.

4. A video communication quality estimation apparatus which estimates quality associated with video communication of bidirectionally exchanging an audio medium and a video medium upon compositing the audio medium and the video medium between communication terminals connected via a network, characterized by comprising:

a multi-modal quality estimation unit which estimates a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a video medium quality evaluation value as a quality evaluation value of the video medium;

a delay quality degradation amount estimation unit which estimates a delay quality degradation amount caused by an audio medium delay and a video medium delay on the basis of an audio delay time as a delay time from input of the audio medium to output of the audio medium between communication terminals and a video delay time as a delay time from input of the video medium to output of the video medium between the communication terminals; and a video communication quality estimation unit which estimates quality of the video communication on the basis of the multi-modal quality value estimated by said multi-modal quality estimation unit and the delay quality degradation amount estimated by said delay quality degradation amount estimation unit, characterized in that an absolute delay quality degradation amount estimation unit which estimates an absolute delay quality degradation amount originating from an absolute delay of the audio medium and an absolute delay of the video medium on the basis of the audio delay time and the video delay time, and a relative delay quality degradation amount estimation unit which estimates a relative delay quality degradation amount originating from a relative delay between the audio medium and the video medium on the basis of the audio delay time, the video delay time, an a frame rate of the video medium, characterized in that said delay quality degradation amount estimation unit includes:

a storage unit which stores, in advance, a relative delay quality degradation amount estimation model comprising a linear function representing a delay time difference relative delay quality degradation amount characteristic that a relative delay quality degradation amount monotonically increases with an increase in a delay time difference between an audio delay time and a video delay time, and a slope coefficient estimation model representing a slope coefficient characteristic that a slope coefficient of the linear function increases in a logarithmic function manner with an increase in frame rate; and a slope coefficient calculation unit which calculates a slope coefficient of the linear function corresponding to a frame rate of the video medium on the basis of the slope coefficient estimation model, and said relative delay quality degradation amount estimation unit calculates a relative delay quality degradation amount corresponding to a delay time difference between the audio delay time and the video delay time on the basis of the relative delay quality degradation amount estimation model specified by the slope coefficient.

5. A video communication quality estimation apparatus according to claim 4, characterized in that said storage unit stores a plurality of relative delay quality degradation amount estimation models and a plurality of coefficient estimation models which correspond to a relationship in magnitude between an audio delay time and a video delay time, said slope coefficient calculation unit selects a slope coefficient estimation model corresponding to the relationship in magnitude between the audio delay time and the video delay time from said storage unit, and calculates the slope coefficient on the basis of the selected slope coefficient estimation model, and said relative delay quality degradation amount estimation unit specifies a slope from the selected slope coefficient by selecting a relative delay quality degradation amount estimation model corresponding to the relationship in magnitude between the audio delay time and the video delay time from said storage unit, and calculates a relative delay quality degradation amount corresponding to a delay time difference between the audio delay time and the video delay time on the basis of the obtained relative delay quality degradation amount estimation model.

6. A video communication quality estimation method used for a video communication quality estimation apparatus which estimates quality associated with video communication of bidirectionaless exchanging an audio medium and a video medium upon compositing the audio medium and the video medium between communication terminals connected via a network, characterized by comprising:

a multi-modal quality estimation step of causing a multi-modal quality estimation unit to estimate a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a video medium quality evaluation value as a quality evaluation value of the video medium;

an absolute delay quality degradation amount estimation step of causing a delay quality degradation amount estimation unit to estimate a delay quality degradation amount caused by an audio medium delay and a video medium delay on the basis of an audio delay time as a delay time from input of the audio medium to output of the audio medium between communication terminals and a video delay time as a delay time from input of the video medium to output of the video medium between the communication terminals;

a video communication quality estimation step of causing a video communication quality estimation unit to estimate quality of the video communication on the basis of the multi-modal quality value estimated by the multi-modal quality estimation unit and the delay quality degradation amount estimated by the delay quality degradation amount estimation unit;

a storage step to cause a storage unit to store, in advance, a delay quality degradation amount estimation model representing a relationship between an audio delay time, a video delay time, and a delay quality degradation amount; and a delay quality degradation amount calculates step to cause a delay quality degradation amount calculation unit to calculate a delay quality degradation amount corresponding to the audio delay time and the video delay time on the basis of the delay quality degradation amount estimation model, wherein the delay quality degradation amount estimation unit has a convex characteristic that when the audio delay time is constant, the delay quality degradation amount monotonically increases and reaches a predetermined maximum value with an increase in the video delay time, and monotonically decreases with a further increase in the video delay time, and a convex characteristic that when the video delay time is constant, the delay quality degradation amount monotonically increases and reaches a predetermined maximum value with an increase in the audio delay time, and monotonically decreases with a further increase in the audio delay time.

7. A non-transitory computer-readable storage medium which cause a computer of a video communication quality estimation apparatus which estimates quality associated with video communication of bidirectionally exchanging an audio medium and a video medium upon compositing the audio medium and the video medium between communication terminals connected via a network to perform a set of steps comprising:

a multi-modal quality estimation step of causing a multi-modal quality estimation unit to estimate a multi-modal quality value as a quality evaluation value of a composite medium obtained by compositing an audio medium output from a communication terminal and a video medium output from the communication terminal on the basis of an audio medium quality evaluation value as a quality evaluation value of the audio medium and a video medium quality evaluation value as a quality evaluation value of the video medium;

an absolute delay quality degradation amount estimation step of causing a delay quality degradation amount estimation unit to estimate a delay quality degradation amount caused by an audio medium delay and a video medium delay on the basis of an audio delay time as a delay time from input of the audio medium to output of the audio medium between communication terminals and a video delay time as a delay time from input of the video medium to output of the video medium between the communication terminals;

a video communication quality estimation step of causing a video communication quality estimation unit to estimate quality of the video communication on the basis of the multi-modal quality value estimated by the multi-modal quality estimation unit and the delay quality degradation amount estimated by the delay quality degradation amount estimation unit;

a storage step to cause a storage unit to store, in advance, a delay quality degradation amount estimation model representing a relationship between an audio delay time, a video delay time, and a delay quality degradation amount; and a delay quality degradation amount calculates step to cause a delay quality degradation amount calculation unit to calculate a delay quality degradation amount corresponding to the audio delay time and the video delay time on the basis of the delay quality degradation amount estimation model, wherein the delay quality degradation amount estimation unit has a convex characteristic that when the audio delay time is constant, the delay quality degradation amount monotonically increases and reaches a predetermined maximum value with an increase in the video delay time, and monotonically decreases with a further increase in the video delay time, and a convex characteristic that when the video delay time is constant, the delay quality degradation amount monotonically increases and reaches a predetermined maximum value with an increase in the audio delay time, and monotonically decreases with a further increase in the audio delay time.

* * * * *

UNITED STATES PATENT AND TRADEMARK OFFICE
CERTIFICATE OF CORRECTION

PATENT NO. : 8,405,773 B2
APPLICATION NO. : 11/990256
DATED : March 26, 2013
INVENTOR(S) : Takanori Hayashi and Kazuhisa Yamagishi It is certified that error appears in the above-identified patent and that said Letters Patent is hereby corrected as shown below:

In the Claims, Column 37, Claim 4, line 61, please delete "an" and insert --and--.

Signed and Sealed this
Sixth Day of August, 2013

Teresa Stanek Rea
*Acting Director of the United States Patent and Trademark Office*